United States Patent
Plastina et al.

(10) Patent No.: US 7,262,357 B2
(45) Date of Patent: Aug. 28, 2007

(54) SYSTEMS FOR PER PERSONA PROCESSING MEDIA CONTENT-ASSOCIATED METADATA

(75) Inventors: Daniel Plastina, Sammamish, WA (US); Khurshed Mazhar, Kirkland, WA (US); Scott Colville, Kirkland, WA (US); James M. Alkove, Woodinville, WA (US); Kirt A. Debique, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 38 days.

(21) Appl. No.: 11/096,628

(22) Filed: Apr. 1, 2005

(65) Prior Publication Data

US 2005/0172786 A1 Aug. 11, 2005

Related U.S. Application Data

(63) Continuation of application No. 10/959,014, filed on Oct. 5, 2004, which is a continuation of application No. 10/100,513, filed on Mar. 21, 2002, now Pat. No. 7,220,910.

(51) Int. Cl.
*G10H 1/18* (2006.01)
*G10H 1/00* (2006.01)
*G10H 7/00* (2006.01)

(52) U.S. Cl. .................. 84/615; 369/30.08; 715/811

(58) Field of Classification Search ............ 369/30.07, 369/30.08, 30.09; 715/733, 789, 811; 84/615
See application file for complete search history.

(56) References Cited

U.S. PATENT DOCUMENTS

| | | | |
|---|---|---|---|
| 5,430,872 A | 7/1995 | Dahod et al. | |
| 6,026,439 A | 2/2000 | Chowdhury et al. | |
| 6,064,379 A | 5/2000 | DeMoney | |
| 6,243,328 B1 | 6/2001 | Fenner et al. | |
| 6,248,946 B1 | 6/2001 | Dwek | |
| 6,266,060 B1 | 7/2001 | Roth | |
| 6,389,467 B1 | 5/2002 | Eyal | |

(Continued)

FOREIGN PATENT DOCUMENTS

EP 1253529 A1 4/2001

(Continued)

OTHER PUBLICATIONS

Sychronized Multimedia Integration Language (SMIL 2.0) (Aug. 7, 2001) (http://www.w3.org/ TR/2001/REC-smil20-20010807).

(Continued)

*Primary Examiner*—Jeffrey W Donels

(57) ABSTRACT

Various systems and methods described above permit a user's content experience (e.g. music playing experience) to be monitored and for metadata describing this experience to be collected. This metadata can be dynamically updated as a user experiences media content and then used to impart to the user a personalized experience that is tailored to that specific user. A user's metadata can, in some instances, provided across a wide variety of computing devices on which the user may experience the media content, thus standardizing the user's personalized media experience. In addition, intelligent or "smart" playlists can be provided which, in some instances, can be dynamically and automatically updated to reflect current user experiences, thus providing a highly personalized and enjoyable content experience.

8 Claims, 16 Drawing Sheets

U.S. PATENT DOCUMENTS

| | | | |
|---|---|---|---|
| 6,393,430 B1 | 5/2002 | Van Ryzin | |
| 6,418,421 B1 | 7/2002 | Hurtado et al. | |
| 6,441,832 B1 | 8/2002 | Tao et al. | |
| 6,446,080 B1 | 9/2002 | Van Ryzin et al. | |
| 6,496,826 B1 | 12/2002 | Chowdhury et al. | |
| 6,505,160 B1 | 1/2003 | Levy et al. | |
| 6,526,411 B1 | 2/2003 | Ward | |
| 6,530,082 B1 | 3/2003 | Del Sesto et al. | |
| 6,542,445 B2 | 4/2003 | Ijichi et al. | |
| 6,587,127 B1 | 7/2003 | Leeke et al. | |
| 6,611,813 B1 | 8/2003 | Bratton | |
| 6,657,116 B1 | 12/2003 | Gunnerson | |
| 6,731,312 B2 | 5/2004 | Robbin | |
| 6,735,628 B2 | 5/2004 | Eyal | |
| 6,748,395 B1 | 6/2004 | Picker et al. | |
| 6,760,721 B1 | 7/2004 | Chasen et al. | |
| 6,766,357 B1 | 7/2004 | Fandozzi | |
| 6,771,568 B2 | 8/2004 | Hochendoner | |
| 6,839,059 B1 | 1/2005 | Anderson et al. | |
| 6,865,600 B1 | 3/2005 | Brydon et al. | |
| 6,879,862 B2 | 4/2005 | Brown et al. | |
| 6,880,132 B2 | 4/2005 | Uemura | |
| 6,910,220 B2 | 6/2005 | Hickey et al. | |
| 6,941,324 B2 | 9/2005 | Plastina et al. | |
| 7,143,102 B2 | 11/2006 | Fiennes et al. | |
| 2001/0031066 A1 | 10/2001 | Meyer et al. | |
| 2002/0032019 A1 | 3/2002 | Marks | |
| 2002/0055988 A1 | 5/2002 | Wishoff et al. | |
| 2002/0062252 A1 | 5/2002 | Van Zoest et al. | |
| 2002/0075320 A1 | 6/2002 | Kurapati | |
| 2002/0082901 A1 | 6/2002 | Dunning et al. | |
| 2002/0120925 A1 | 8/2002 | Logan | |
| 2002/0152278 A1 | 10/2002 | Pontenzone | |
| 2002/0184180 A1 | 12/2002 | Debique et al. | |
| 2003/0009452 A1 | 1/2003 | O'Rourke et al. | |
| 2003/0028505 A1 | 2/2003 | O'Rourke | |
| 2003/0037038 A1 | 2/2003 | Weare | |
| 2003/0037157 A1 | 2/2003 | Pestoni | |
| 2003/0052913 A1 | 3/2003 | Barile | |
| 2003/0060728 A1 | 3/2003 | Mandigo | |
| 2003/0065639 A1 | 4/2003 | Fiennes et al. | |
| 2003/0093790 A1 | 5/2003 | Logan et al. | |
| 2003/0095096 A1 | 5/2003 | Robbin et al. | |
| 2003/0108164 A1 | 6/2003 | Laurin et al. | |
| 2003/0167173 A1 | 9/2003 | Levy | |
| 2003/0182254 A1* | 9/2003 | Plastina et al. | 707/1 |
| 2003/0182255 A1* | 9/2003 | Plastina et al. | 707/1 |
| 2003/0182315 A1* | 9/2003 | Plastina et al. | 707/200 |
| 2004/0064476 A1 | 4/2004 | Rounds | |
| 2005/0022239 A1 | 1/2005 | Meuleman | |
| 2005/0055372 A1 | 3/2005 | Springer et al. | |
| 2005/0098023 A1 | 5/2005 | Toivonen et al. | |
| 2005/0193010 A1 | 9/2005 | DeShan et al. | |
| 2006/0168340 A1 | 7/2006 | Heller et al. | |
| 2006/0195479 A1 | 8/2006 | Spiegelman et al. | |

FOREIGN PATENT DOCUMENTS

WO      WO0167317      9/2001

OTHER PUBLICATIONS

Realone Player RMP Authoring Kit, Release 2, Revision Date: Sep. 19, 2001.

Gonze, Lucas, "A Survey of Playlist Formats", Nov. 17, 2003, 17 pages.

Windows Media Player, "ASX Overview", 4 pages, Jan. 7, 2007.

"Comparison of Media Players", reference article, wikipedia.org, Jul. 12, 2005.

"ITunes", reference article, wikipedia.orp, Jul. 12, 2005.

"Musicmatch and Xing Technology Introduce Musicmatch Jukebox" press release May 18, 1998, musicmatch.com.

Realone Player, "Realone Player Rmp Authoring Kit", (Sep. 19, 2001).

* cited by examiner

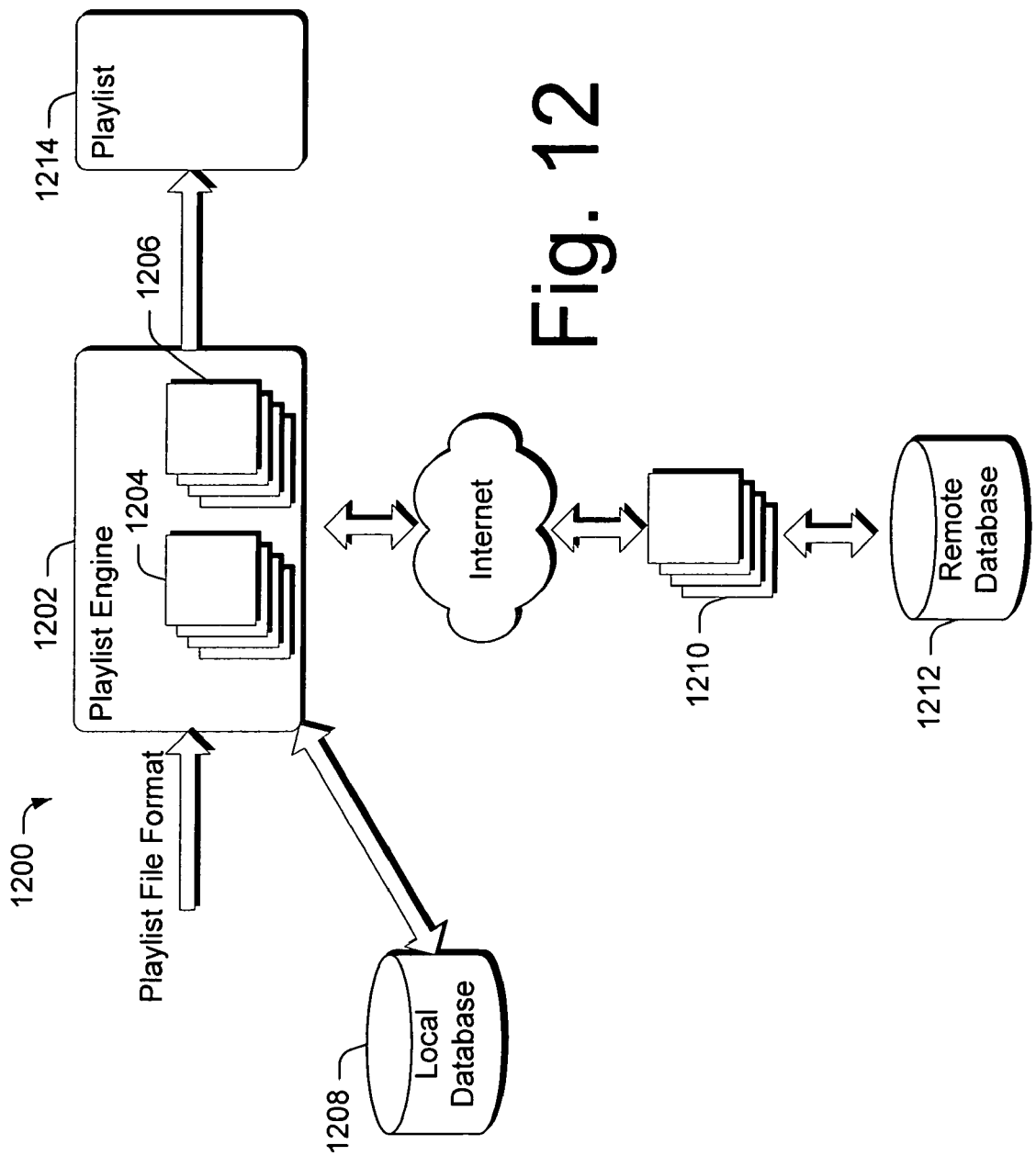

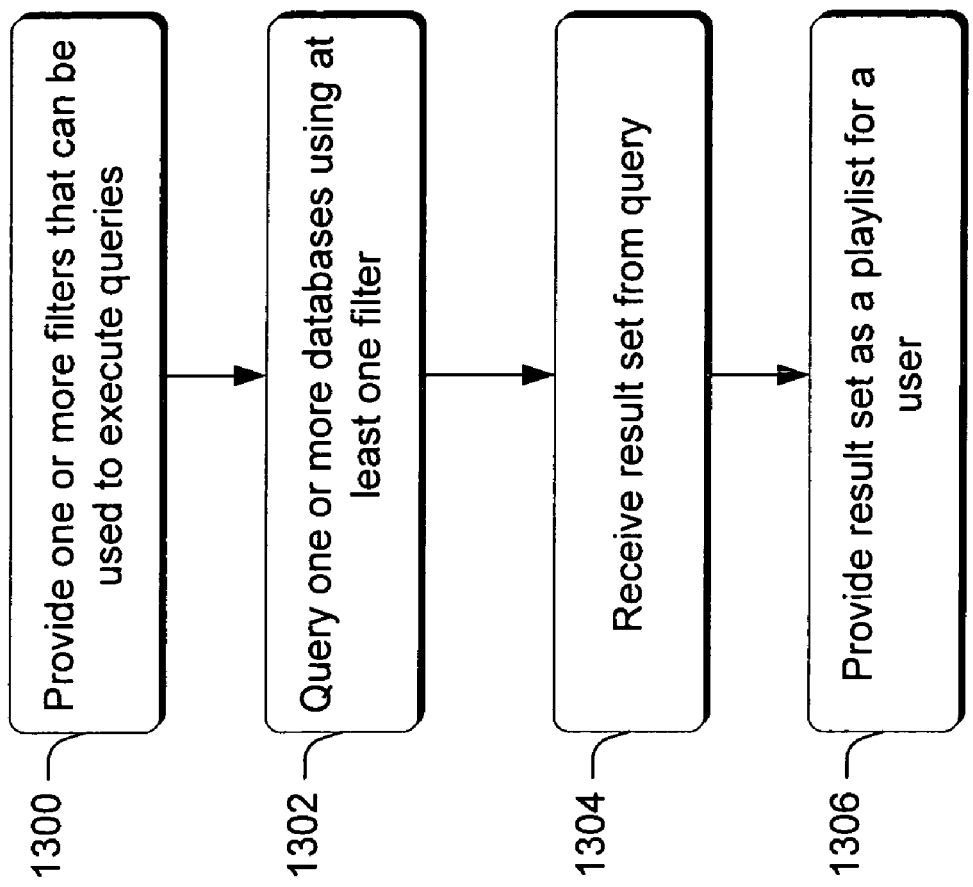

Fig. 14

```
<?wpl version="1.0"?>
<smil>
  <head>
    <title>SampleSmartPlaylist</title>
    <meta name="Author" CONTENT="Dan Plastina"/>
    <meta name="Category" CONTENT="Party Music"/>
    <meta name="Genre" CONTENT="Pop"/>
    <meta name="UserName1" CONTENT="Dan076"/>
    <meta name="UserRating1" CONTENT="82"/>
    <meta name="UserName2" CONTENT="Scott321"/>
    <meta name="UserRating2" CONTENT="20"/>
    <meta name="UserName3" CONTENT="Jim"/>
    <meta name="UserRating3" CONTENT="33"/>
    <meta name="generator" CONTENT="Windows Media Media Foundation Version 0.1.3"/>
  </head>
  <body>
    <seq userName="Dan076" renderedOn = "Tuesday, 22 Jan 2002 16:00:00 PST" ExpiresOn = "Tuesday, 29 Jan 2002 16:00:00 PST">
      <media src="dirRelativePath.wma" cid="F1B9284F-E9DC-4e68-9D7E-42362A59F0FA" tid="12345678-1234-4e68-9D7E-42362A59F0FA">
        <FileTrackingBLOB>0x00....x00</FileTrackingBLOB>
      </media>
      <media src="driveRelativepath.wma" cid="F1B9284F-E9DC-4e68-9D7E-42362A59F0FB" tid="12345678-1234-4e68-9D7E-42362A59F0FB">
        <FileTrackingBLOB>0x00....x00</FileTrackingBLOB>
      </media>
      <media src="D:\driveabsolutepath.wma" cid="F1B9284F-E9DC-4e68-9D7E-42362A59F0FC" tid="12345678-1234-4e68-9D7E-42362A59F0FC">
        <FileTrackingBLOB>0x00....x00</FileTrackingBLOB>
      </media>
      <media src="\\danpl\cmslspecs\Sample.WMP" cid="F1B9284F-E9DC-4e68-9D7E-42362A59F0FD" tid="12345678-1234-4e68-9D7E-42362A59F0FD">
        <FileTrackingBLOB>0x00....x00</FileTrackingBLOB>
      </media>
    </seq>
    <seq>
      <smartPlaylist version="1.0.0">
        <querySet>
          <sourceFilter type="smartFilterObject" id="12345678-1234-3333-9D7E-42362A59F0FD" name="Windows Media Local Music Library Filter">
            <fragment name="Genre">
              <argument name="Condition">EqualTo</argument>
              <argument name="Value">Rock</argument>
            </fragment>
            <fragment name="Artist">
              <argument name="Condition">NotEqualTo</argument>
              <argument name="Value">Elvis</argument>
            </fragment>
          </sourceFilter>
        </querySet>
        <filter type="smartFilterObject" id="12345678-9999-4e68-9D7E-42362A59F0FD" name="Windows Media Playlist Limit Filter">
          <fragment name="LimitBySize">
            <argument name="NumberOfMegabytes">256</argument>
          </fragment>
        </filter>
      </smartPlaylist>
    </seq>
  </body>
</smil>
```

Header / Static Block / Dynamic Block

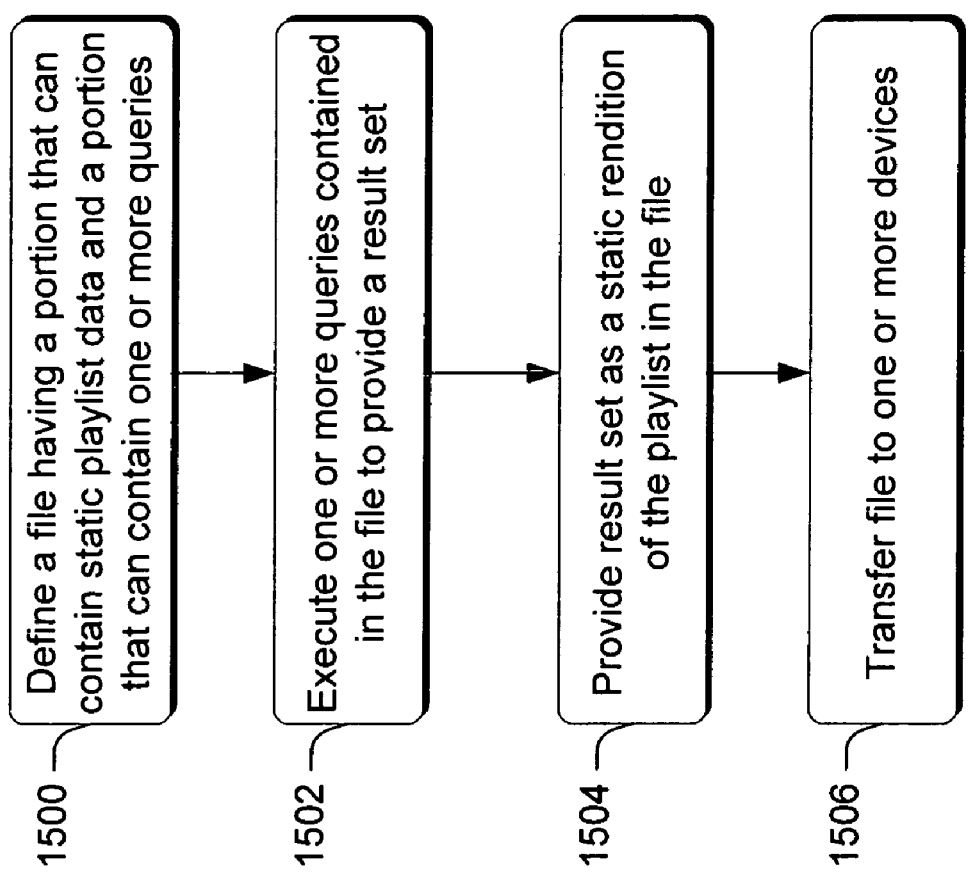

SYSTEMS FOR PER PERSONA PROCESSING MEDIA CONTENT-ASSOCIATED METADATA

RELATED APPLICATION

This application is a continuation of and claims priority to U.S. patent application Ser. No. 10/959,014, filed on Oct. 5, 2004 which, in turn, is a continuation of and claims priority to U.S. patent application Ser. No. 10/100,513, filed on Mar. 21, 2002 now U.S. Pat. No. 7,220,920, the disclosures of which are incorporated by reference.

TECHNICAL FIELD

This invention relates generally to media processing methods and systems.

BACKGROUND

Many computing devices such as personal computers, desk top computers and various handheld computing devices include software that enables various types of media to be played or rendered on the device. Media-playing software can typically play or render digital media in the form of audio and video data. As an example, today people can insert a favorite CD into the CD receptacle of their personal computer and listen to their musical selection while they work on the computer. Further, technological advances in media playing applications have enabled people to not only store media content files (such as music and video files) on their computer for subsequent rendering, but have media content streamed to their computing device for rendering in real time.

One of the tools that has evolved in connection with various media-playing applications is the playlist. A playlist is a customized list of files that a user can define and which will be played or rendered by a media-playing application. A playlist can enable the user to group various media content together to be played in any order specified by the user. For example, a user can define a playlist that includes tracks from particular CDs, a radio station, and a video. The playlist groups the media content and stores the location of the media content so that the media content can be accessed at the appropriate time by the media-playing application and rendered for the user. Thus, playlists can enable a user to custom design their own media experience.

However, while playlists have, in general, provided the user with the opportunity to craft a custom-designed media experience, contemporary playlists suffer from a serious drawback that does not make the user experience all that it could be. Specifically, playlists are typically static in nature and are generally unintelligent. That is, the content that typically comprises the playlist (i.e. the list of files and/or content locations associated with content that is to be played) is generally fixed at the time it is authored and remains that way until the user physically edits the playlist. Thus, playlists at best tend to be flat lists of items that do not change until physically re-authored by a user.

Aside from the issue of playlists and their perceived inadequacies, a more fundamental problem exists and pertains to the inability of the user to have a user-specific media experience provided for them. Specifically, most often the user experiences media content passively. They may turn on a radio station or play a particular CD and are forced to passively listen to the content unless they proactively take some step to change the content to which they are listening. Yet, many users have strong opinions as to what they wish to listen to.

Accordingly, this invention arose out of concerns associated with providing improved media processing methods and systems-particularly methods and systems that can flexibly accommodate users on an individual basis. In addition, this invention arose out of concerns associated with providing improved playlists for use by media processing methods and systems.

BRIEF DESCRIPTION OF THE DRAWINGS

FIG. 12 is a block diagram that illustrates architectural aspects of one embodiment.

FIG. 13 is a flow diagram illustrating steps in a method in accordance with one embodiment.

FIG. 14 illustrates an exemplary file format in accordance with one embodiment.

FIG. 15 is a flow diagram illustrating steps in a method in accordance with one embodiment.

DETAILED DESCRIPTION

Overview

Figure 1:
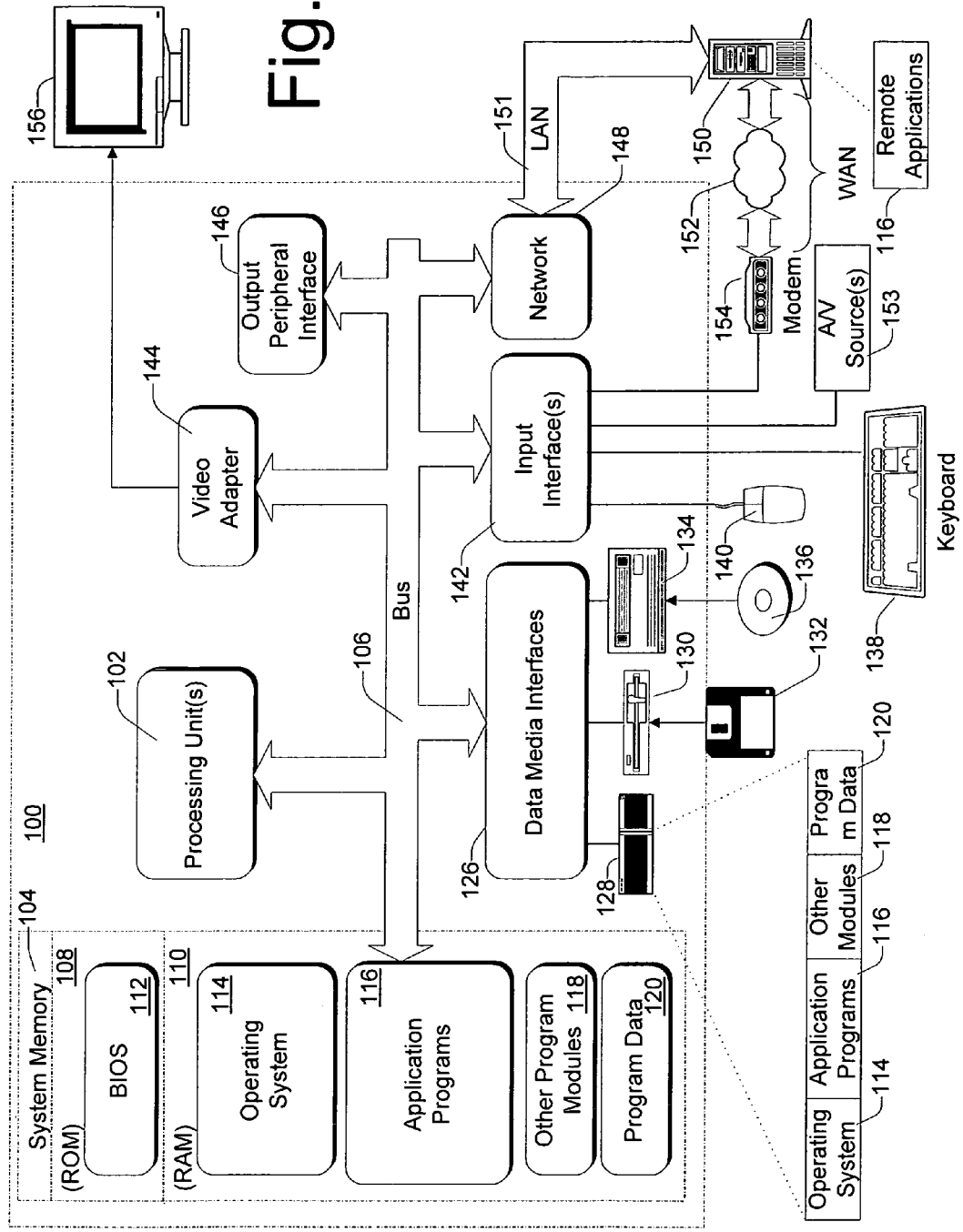
FIG. 1 is a block diagram of an exemplary computer system that can be utilized to implement one or more embodiments.

Various systems and methods described below permit a user's content experience (e.g. interaction experience or music playing experience) to be monitored and for metadata describing this experience to be collected. As used in this document, the term "metadata" will be understood to include one or more metadata items. The metadata is developed by monitoring a number of different parameters that are associated with the user's content experience. This metadata can be dynamically updated as a user experiences or interacts with media content and then used to impart to the user a personalized experience that is tailored to that specific user. In some embodiments, the metadata can be actually associated with the specific media content that a user can experience by playing the media content. Additionally, the user can experience media content in other ways such as managing the media content, moving or copying the media content from one location to another, or a variety of other ways outside of simply listening to or playing the media content. All of these various operations imply, in some way, that the user has a certain care for or interest in the media content. The fact that the user went to media content and operated on it somehow implies that there is an implicit interest in that media content that is greater than simply playback.

In some embodiments, a user's metadata and, in some instances the associated media content, can be provided across a wide variety of computing devices on which the user may experience the media content, thus standardizing the user's personalized media experience. As metadata for the user is modified, it can be reconciled across one or more devices so that the user's metadata is generally up-to-date.

In some embodiments, multiple users can share one or more computing devices. In these embodiments, each of the user's metadata can be collected and used to provide each user an experience that is unique for them. This metadata can, as described above, be provided across and reconciled on multiple different computing devices that the users might use to experience media content.

In addition, inventive new file structures and formats are provided that conveniently enable one or more user's metadata to be collected and, in some instances, bundled with its associated content. Privacy concerns are addressed, in some embodiments, by uniquely identifying individual users in a manner that they and perhaps others within their group can recognize, but which others outside the group are not able to recognize and/or backward decode to ascertain the user's actual identity.

Using the above-referenced systems and methods, intelligent or "smart" playlists can be provided which, in some embodiments, can be dynamically and automatically updated to reflect current user experiences. The smart playlists can make use of the rich and robust collection of user metadata to tailor playlists for individual users that accurately reflect the user's desired experiences, thus providing a highly personalized and enjoyable content experience.

In one implementation, a novel file structure or format is provided to define individual playlist files that can be processed by a playlist engine. The playlist engine can, in some embodiments, process the playlist file to access one or more filters that can be used to execute queries against one or more databases that contain the user metadata. The queries can also be contained in the playlist file. In addition, support is provided in the file structure for computing devices that are not capable of executing database queries, but which can be used by the user to access and play content contained in a playlist. This support comes in the form of a static portion of the file format that contains a content list that essentially lists the various content that is the subject of the playlist. This static portion can be developed and provided into the file whenever a playlist engine executes a database query on a computing device that supports such queries.

In addition, in some embodiments, the playlists that are generated are able to intelligently repair themselves. That is, within the file structure various paths to media content can be defined. If media content is, for some reason moved such that it does not coincide with its path, the file structure includes data that can be used to find the media content and to intelligently repair or replace the old path with a new, accurate path.

In some embodiments, intelligent processing can be done locally, within the realm of the user's computing environment. That is, all personalization can be done within the user's purview and need not be made available to others. Thus, the user can have intelligent personalization without any of their information being divulged to another party.

Exemplary Computer Environment

FIG. 1 illustrates an example of a suitable computing environment 100 on which the system and related methods described below can be implemented.

It is to be appreciated that computing environment 100 is only one example of a suitable computing environment and is not intended to suggest any limitation as to the scope of use or functionality of the media processing system. Neither should the computing environment 100 be interpreted as having any dependency or requirement relating to any one or combination of components illustrated in the exemplary computing environment 200.

The inventive techniques can be operational with numerous other general purpose or special purpose computing system environments, configurations, or devices. Examples of well known computing systems, environments, devices and/or configurations that may be suitable for use with the described techniques include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments, hand-held computing devices such as PDAs, cell phones and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 1, computing system 100 is shown comprising one or more processors or processing units 102, a system memory 104, and a bus 106 that couples various system components including the system memory 104 to the processor 102.

Bus 106 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 100 typically includes a variety of computer readable media. Such media may be any available media that is locally and/or remotely accessible by computer 100, and it includes both volatile and non-volatile media, removable and non-removable media.

In FIG. 1, the system memory 104 includes computer readable media in the form of volatile, such as random access memory (RAM) 110, and/or non-volatile memory, such as read only memory (ROM) 108. A basic input/output system (BIOS) 112, containing the basic routines that help to transfer information between elements within computer 100, such as during start-up, is stored in ROM 108. RAM 110 typically contains data and/or program modules that are immediately accessible to and/or presently be operated on by processing unit(s) 102.

Computer 100 may further include other removable/non-removable, volatile/non-volatile computer storage media. By way of example only, FIG. 1 illustrates a hard disk drive 128 for reading from and writing to a non-removable, non-volatile magnetic media (not shown and typically called a "hard drive"), a magnetic disk drive 130 for reading from and writing to a removable, non-volatile magnetic disk 132 (e.g., a "floppy disk"), and an optical disk drive 134 for reading from or writing to a removable, non-volatile optical disk 136 such as a CD-ROM, DVD-ROM or other optical media. The hard disk drive 128, magnetic disk drive 130, and optical disk drive 134 are each connected to bus 106 by one or more interfaces 126.

The drives and their associated computer-readable media provide nonvolatile storage of computer readable instructions, data structures, program modules, and other data for computer 100. Although the exemplary environment described herein employs a hard disk 128, a removable magnetic disk 132 and a removable optical disk 136, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 128, magnetic disk 132, optical disk 136, ROM 108, or RAM 110, including, by way of example, and not limitation, an operating system 114, one or more application programs 116 (e.g., a multimedia application program), other program modules 118, and program data 120. A user may enter commands and information into computer 100 through input devices such as keyboard 138 and pointing device 140 (such as a "mouse"). Other input devices may include a audio/video input device(s) 153, a microphone, joystick, game pad, satellite dish, serial port, scanner, or the like (not shown). These and other input devices are connected to the processing unit(s) 102 through input interface(s) 142 that is coupled to bus 106, but may be connected by other interface and bus structures, such as a parallel port, game port, or a universal serial bus (USB).

A monitor 156 or other type of display device is also connected to bus 106 via an interface, such as a video adapter 144. In addition to the monitor, personal computers typically include other peripheral output devices (not shown), such as speakers and printers, which may be connected through output peripheral interface 146.

Computer 100 may operate in a networked environment using logical connections to one or more remote computers, such as a remote computer 150. Remote computer 150 may include many or all of the elements and features described herein relative to computer.

As shown in FIG. 1, computing system 100 is communicatively coupled to remote devices (e.g., remote computer 150) through a local area network (LAN) 151 and a general wide area network (WAN) 152. Such networking environments are commonplace in offices, enterprise-wide computer networks, intranets, and the Internet.

When used in a LAN networking environment, the computer 100 is connected to LAN 151 through a suitable network interface or adapter 148. When used in a WAN networking environment, the computer 100 typically includes a modem 154 or other means for establishing communications over the WAN 152. The modem 154, which may be internal or external, may be connected to the system bus 106 via the user input interface 142, or other appropriate mechanism.

In a networked environment, program modules depicted relative to the personal computer 100, or portions thereof, may be stored in a remote memory storage device. By way of example, and not limitation, FIG. 1 illustrates remote application programs 116 as residing on a memory device of remote computer 150. It will be appreciated that the network connections shown and described are exemplary and other means of establishing a communications link between the computers may be used.

Monitoring a User's Content Experience

In the embodiments described below, a user's so-called content experience is monitored and data describing this experience is maintained. This maintained data can then form the basis for a robust collection of future user-specific content experiences. In the example that follows, the content that is utilized for illustrative purposes is music content, such as that a user would listen to on a computing device via an appropriate media-playing application. It is to be appreciated that the various inventive principles can be utilized in connection with content other than, or not solely music content, e.g. video content, audio/video content, images/photos and the like. In addition, it is to be appreciated and understood that the user can experience the media content in ways other than simply playing the media content. Examples of this are noted above.

Figure 2:
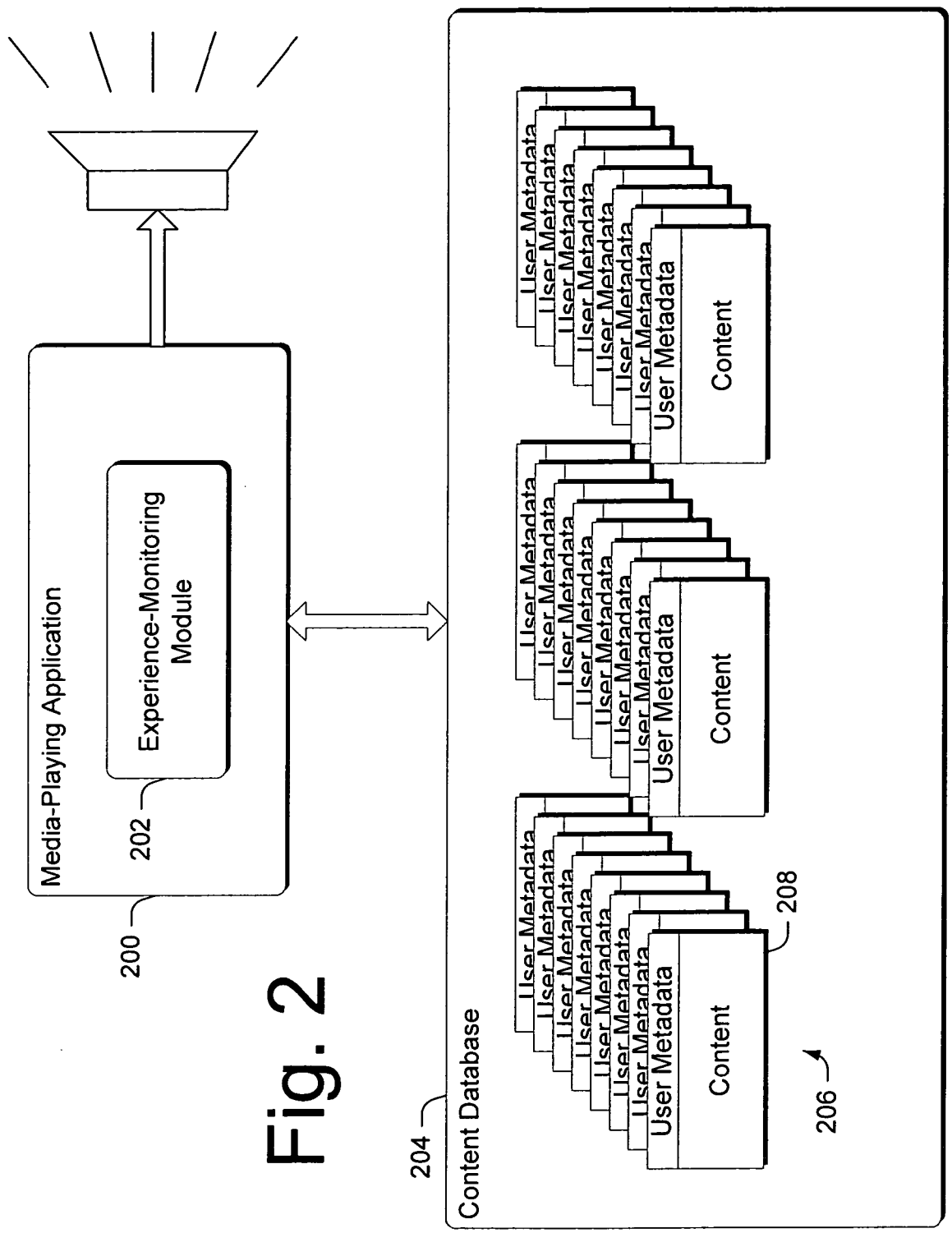
FIG. 2 is a block diagram illustrating a media-playing application and a content database in accordance with one embodiment.

FIG. 2 shows but one exemplary system that can be utilized to monitor a user's content experience and maintain data that is associated with that experience. Here, a media-playing application 200 is provided and can comprise part of a user's computing device (e.g. personal computer, handheld and the like). An experience-monitoring module 202 is provided and, in this example, comprises part of the media-playing application. Such need not, however, be the case. For example, the experience-monitoring module can comprise a separate component or part of another component. In addition, the experience-monitoring module can be located locally on the user's computing device, or remotely on another computing device such as a server.

A content database 204 is provided and contains content that is renderable or playable by the media-playing application 200. The term "database" as used in this document is intended to mean not only traditional database structures, but more generally, collections of items, materials or content such as files and the like. The content database can be located locally on the user's computing device. Additionally or alternately, the content database or portions thereof can be located remotely. The content database can contain a content collection 206 comprising one or more pieces of content 208 that can be played or rendered by the media-playing application 200. Each piece of content 208 includes a content portion (designated as "content"), and can include a user metadata portion (designated "user metadata").

In the illustrated example, the content collection 206 comprises a collection of music content. Additionally, each piece of content 208, in this example, comprises an individual song or track that can be played by the media-playing application. It is to be appreciated that the level of granularity at which the content pieces are provided can be other than at the song or track level. Such content portions are typically provided as individual files or entries. Thus, in this example, the user has many different songs or tracks that are available for rendering by the media-playing application.

As a user selects various pieces of content 208 to be rendered by the media-playing application, the experience-monitoring module 202 can make a note of this and can produce user metadata that is provided back into the user metadata portion of the piece of content. Thus, relevant current data that is associated with the user's content experience can be developed and associated with the particular content for future use. This developed metadata can be tightly bound to the content so that the user's experience or, in this example the user's "listening habits" can be learned and subsequently used, as will become more apparent below.

Figure 3:
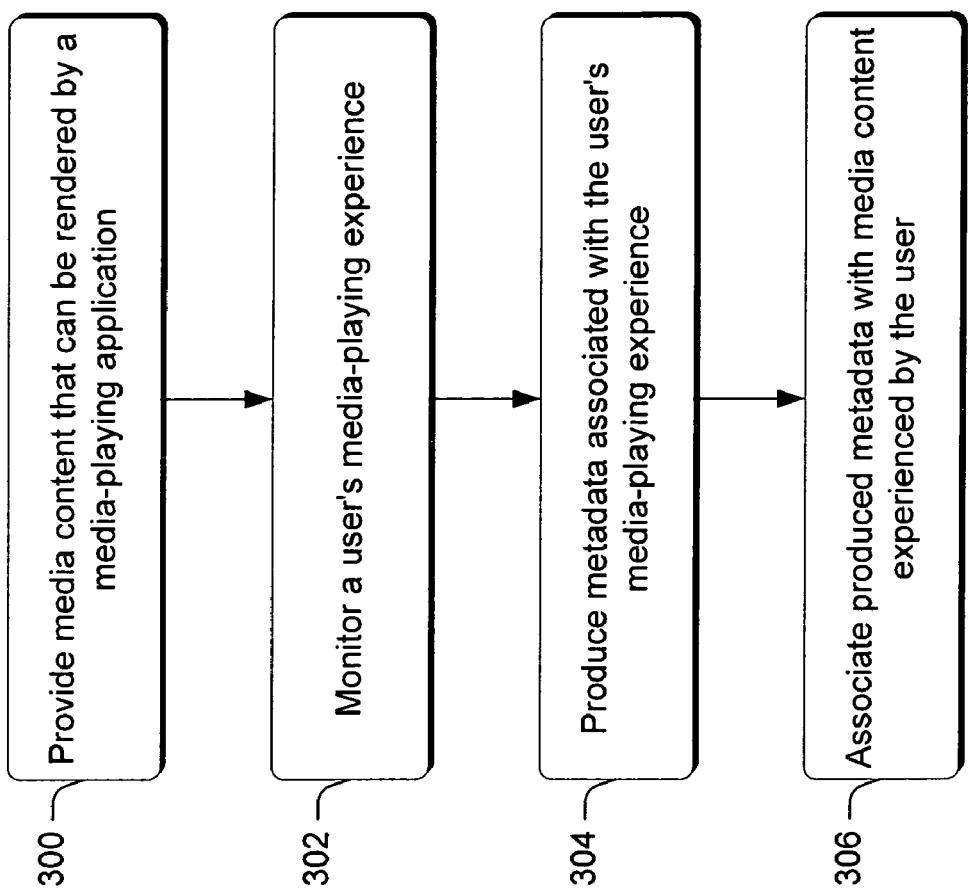
FIG. 3 is a flow diagram illustrating steps in a method in accordance with one embodiment.

FIG. 3 is a flow diagram of steps in a method in accordance with one embodiment. The method can be implemented in any suitable hardware, software, firmware, or combination thereof. In but one embodiment, the method can be implemented in software.

Step 300 provides media content that can be rendered by a media-playing application. Any suitable content can be provided such as digital audio, digital video, digital audio/video, and/or photos/images and the like. In one embodiment, such as one that is discussed above, the media content is provided as music content. Typically, although not exclusively, such content is provided as a file or files that are located on a local computing device such as a user's personal computer or handheld device. Such content can, however, be provided on a remotely-accessible device such as another computer or server linked via a network. Step 302 monitors a user's media-playing experience. This step can be implemented by noting, among other things, what content is experienced by the user and when it is experienced. In the music content embodiment, this step is implemented by monitoring the user's listening habits. Non-exclusive, specific examples of parameters that can be monitored are given below in the section entitled "Exemplary Schema of User Behaviors".

Step 304 produces metadata associated with the user's media-playing experience. This step can be implemented by producing metadata that is associated with the various parameters that can be monitored. Again, examples of this are provided below. Step 306 associates produced metadata with media content experienced by the user. This step can be implemented in any suitable way. For example, the metadata can comprise part of a piece of content that includes the content itself, an example of which is given above.

By developing metadata and associating, in some way, the metadata with the content that a user experiences, the user can be provided a rich and robust media experience. This will become more clear below.

Exemplary Schema of User Behaviors

As a user's content experience is monitored, a number of different parameters can be monitored and associated as metadata with the content the user experiences. The examples given below are intended as examples only and should not, accordingly, be construed to limit the parameters or types of parameters that can be utilized. Hence, other parameters can be used without departing from the spirit and scope of the claimed subject matter.

Exemplary parameters that can be monitored, each of which are explained below include, without limitation:

USER_UPDATE_TIME
USER_LAST_PLAYED_TIME
USER_RATING
USER_EFFECTIVE_RATING
USER_SERVICE_RATING
USER_PLAYCOUNT_TOTAL
USER_PLAYCOUNT_MORNING
USER_PLAYCOUNT_AFTERNOON
USER_PLAYCOUNT_EVENING
USER_PLAYCOUNT_NIGHT
USER_PLAYCOUNT_WEEKDAY
USER_PLAYCOUNT_WEEKEND
USER_PLAYCOUNT_EVERYDAY
USER_CUSTOM_N
USER_EFFECTIVE_RATING_COMPUTED
USER_UPDATE_TIME

The user update time is the time that any of the other schema items or parameters are updated. That is, some of the parameters can be physically updated by the user (e.g. user rating) and other parameters can be updated automatically by the system. This parameter keeps track of when the parameters were updated. This can be a useful piece of information in the event that the user utilizes multiple different computing devices to experience common media. For example, the user may have a home computer and an office computer on which they listen to their CD collection. In this event, the user update time can be utilized for a reconciliation process to reconcile the user's listen habits between devices. That is, assume that there is a media file (such as content piece 208 in FIG. 2) that contains content (i.e. music) and the user's developed metadata. On a first device (perhaps their home computer) the user changes a user rating (see below) on a song from 4 to 5. On their office device, the song still carries the older rating of 4. During a reconciliation process, the user's metadata from their home device can be reconciled with the metadata on their office device. In this case, the user update time will indicate that the last time there was a rating change, the song in question had a rating change from a 4 to 5. Thus, the metadata on the user's office device can be updated to reflect the most current user metadata.

USER_LAST_PLAYED_TIME

The last played time parameter comprises the date or time that a particular piece of content was played or experienced by the user. This parameter can be used to implement intelligent playlists which are described in more detail below in the section entitled "Intelligent Playlists".

USER_RATING

The user rating parameter can be used to allow the user to rate their content. For example, the user can assign values to content based on whether they like or dislike the content and the degree to which they like or dislike the content. In the illustrated and described embodiment, the user can use a "star rating" system where one star is associated with content the user dislikes and five stars is associated with content that the user likes the most, with varying values therebetween.

USER_EFFECTIVE_RATING

The effective rating parameter is a tool that can be used by the system to provide an "effective rating" for content that the user has not physically rated. That is, the system can automatically monitor the user and their content choices. Based on the user's content choices and frequency of play, the system can assign an effective rating. Effective ratings can be assigned at various levels of granularity as well. For example, effective ratings can be assigned for defined time periods, e.g. "Songs I like on Sunday night", "Songs I like on Monday mornings" and the like.

In addition, the effective ratings can be visually distinguished, in the user interface, from the user ratings. For example, the user's ratings can be displayed as bright yellow stars and the effective ratings can be displayed as dim yellow stars. One example of this appears in, and is discussed in relation to the user interface of FIG. 11.

USER_SERVICE_RATING

The user service rating parameter can be used to provide a rating from a third party. For example, a web service such as MSN music can provide a rating for the content. This parameter can be useful for computing effective ratings.

USER_PLAYCOUNT_TOTAL

The playcount total comprises the total number of times a particular piece of content has been played by the user. This parameter can be useful for computing effective ratings.

USER_PLAYCOUNT_MORNING, AFTERNOON, EVENING, NIGHT, WEEKDAY, WEEKEND, EVERYDAY

These various parameters enable the system to keep track of when content is played throughout the day. For example, the playcount morning parameter can be used to keep a playcount of the content that is played from 6 A.M. to noon, the playcount afternoon can be used to keep a playcount of the content that is played between noon and 5 P.M. and so on.

These parameters can be useful for determining the user's content-experiencing habits relative to different times of day or through the week. This information can be used, in the case of intelligent playlists (described below), to provide the user with a rich, user-specific content-experience. For example, the user can define an intelligent playlist that comprises "Songs I like in the evening." Thus, when the playlist is opened by the user, the user will have displayed, via the user interface, all of the songs that they have listened to in the evening. The same can be said for a playlist comprising "Songs I like on Weekends", "Songs I like Everyday", or "Songs I like on Sunday night". As the user plays music on Sunday night, this playlist can change dynamically, as will be more apparent below.

USER_CUSTOM_{N}

The user custom parameter can be provided to enable the user to program their own individual schema items. The "N" designation indicates that any number of user-defined parameters can be defined. In addition, the parameters can be defined per media or per user. In addition, these custom parameters can also be used by third parties (such as a web service) to put their own rating or perhaps an expiration date into the system. Thus, the custom parameters enable an extensibility feature to be added.

USER_EFFECTIVE_RATING_COMPUTED

The effective rating computed parameter comprises a timestamp for when the effective rating was computed. This can be provided on a per user basis. This parameter can be useful for purposes of maintaining a current or reasonably current effective rating.

Thus, the above schema can advantageously permit implementation of a great number of personalization features—i.e. those features that are personalized to the user. Advantageously, the user's content experience can be monitored and analyzed at different levels of granularity which, in turn, allows the system to understand a user's behavior at a more fundamental and personal level.

Moving a User's Content Experience Between Devices

Figure 4:
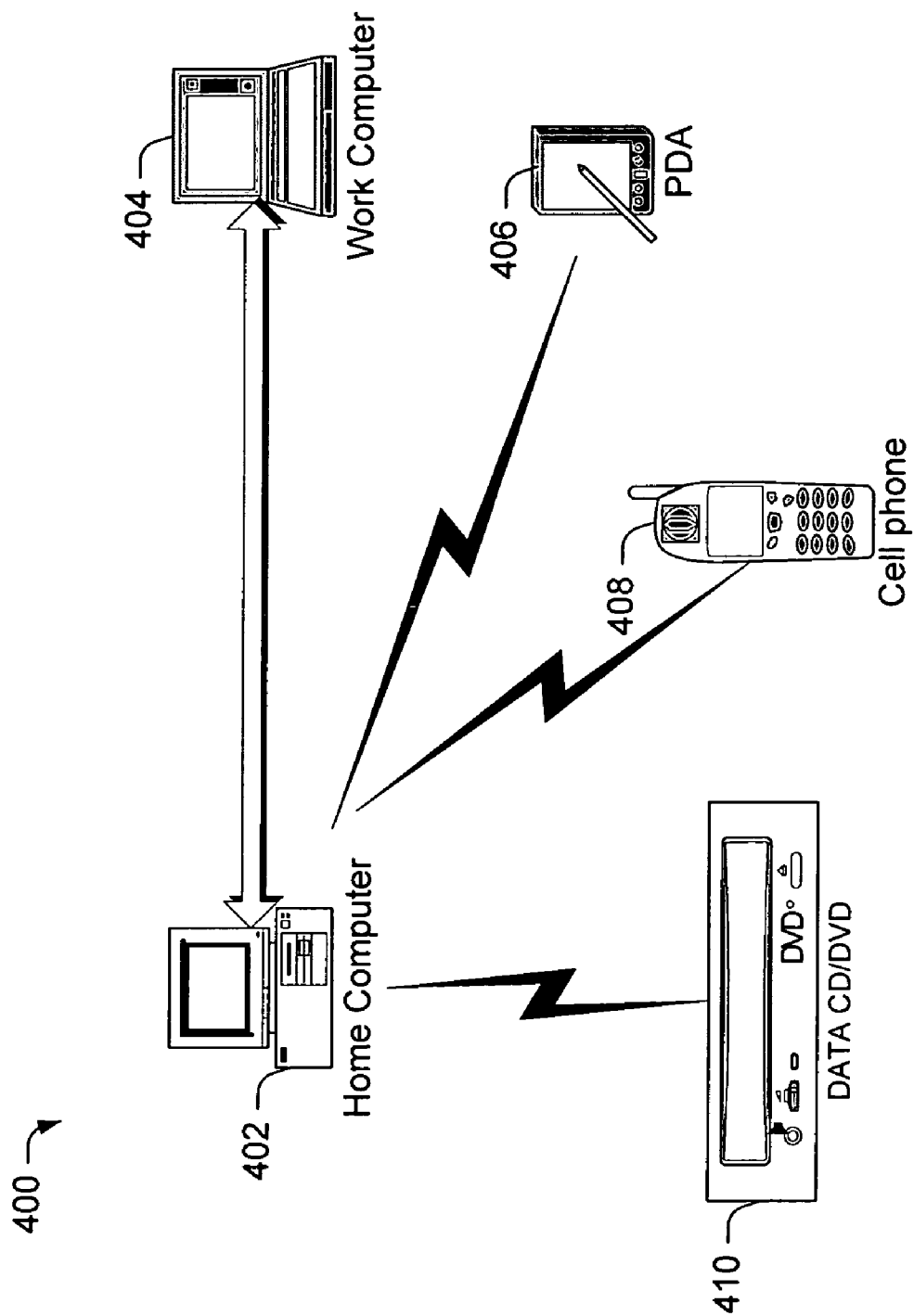
FIG. 4 is a block diagram illustrating different types of computing devices.

In one embodiment, a user's content experience can be maintained across multiple different devices. As an example, consider FIG. 4.

There, a system 400 comprises multiple different "experience points" at which a user may opt to experience particular content. For example, one experience point comprises a home computer 402. Other experience points can comprise a work computer 404, a personal digital assistant 406, a cell phone 408 and a CD or DVD player 410. For purposes of this document, these devices can also be considered as computing devices.

Each of these devices can contain a database that includes the user's metadata. As an example, each device can have a database such as database 204 (FIG. 2) that includes the user's metadata. In addition, each device can, but need not, have the content that is associated with the user's metadata.

Accordingly, when a user experiences content, e.g. listens to music, on their home computer 402, the media-playing application or some other module can monitor and produce metadata as described in FIG. 3. In addition, this metadata can be added to the user's database to update the user's content experience. Periodically, whether through an automatic process or a user-initiated process, the databases on the other devices can be updated. Alternately or additionally, in some embodiments, whenever the user's metadata changes, such changes can be bundled up and pushed to the other devices. For example, the user's home computer 402 and work computer 404 can reconcile the user's metadata via a network connection such as the Internet. This can be a direct or an indirect reconciliation. Specifically, in some embodiments, the home computer can automatically establish a link with the work computer and directly push the changes to the work computer. Alternately, a third party, such as a web service, can include a central database that maintains a user's metadata and can periodically reconcile the user's metadata across devices.

In addition to sharing metadata across devices, in some embodiments, the content (including the metadata) can be shared across the user's devices. For example, assume that the user has several pieces of content with accompanying metadata. Assume also that the user builds playlist on their home computer and transmits the playlist, along with the content, to their handheld device. This can be accomplished via a simple file transfer process. Now, not only does the user's handheld device have the content that the user wishes to experience, it also includes the user's associated metadata. Now, as the user interacts with their playlist and experiences the content on their handheld device, the user's metadata can be modified and subsequently reconciled with the metadata on the user's other devices.

Reconciliation can take place via suitable two-way replication of data whenever a file is moved. This can ensure that data loss is minimized. Bi-directional replication is a well known concept and, for the sake of brevity, it is not further discussed.

Figure 5:
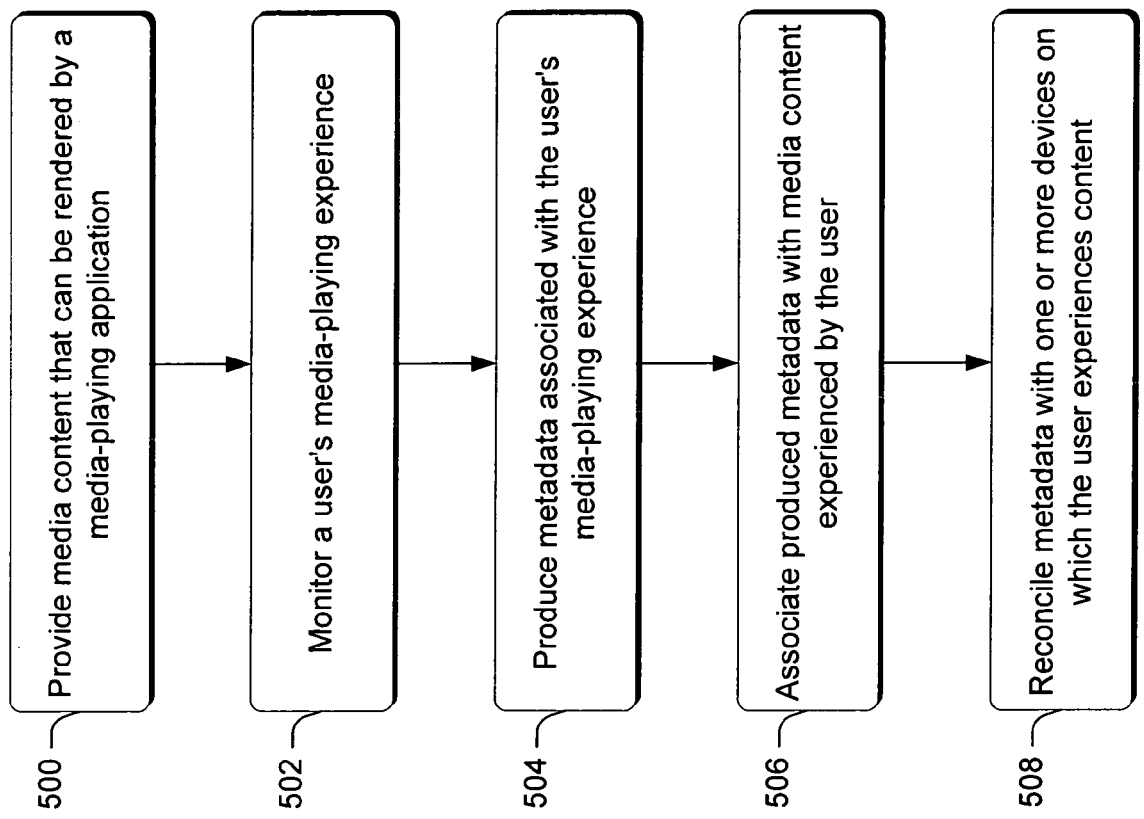
FIG. 5 is a flow diagram illustrating steps in a method in accordance with one embodiment.

FIG. 5 is a flow diagram of steps in a method in accordance with one embodiment. The method can be implemented in any suitable hardware, software, firmware, or combination thereof. In but one embodiment, the method can be implemented in software.

Step 500 provides media content that can be rendered by a media-playing application. Any suitable content can be provided such as digital audio, digital video and/or digital audio/video and the like. In one embodiment, such as one that is discussed above, the media content is provided as music content. Typically, although not exclusively, such content is provided as a file or files that are located on a local computing device such as a user's personal computer or handheld device. Such content can, however, be provided on a remotely-accessible device such as another computer or server linked via a network.

Step 502 monitors a user's media-playing experience. This step can be implemented by noting, among other things, what content is experienced by the user and when it is experienced. In the music content embodiment, this step is implemented by monitoring the user's listening habits. Non-exclusive, specific examples of parameters that can be monitored are given above in the section entitled "Exemplary Schema of User Behaviors".

Step 504 produces metadata associated with the user's media-playing experience. This step can be implemented by producing metadata that is associated with the various parameters that can be monitored. Again, examples of this are provided above. Step 506 associates produced metadata with media content experienced by the user. This step can be implemented in any suitable way. For example, the metadata can comprise part of a piece of content that includes the content itself, an example of which is given above. Additionally or alternately, the metadata can be associated with an identifier that is itself associated with the content.

Step 508 reconciles the user's metadata with one or more devices on which the user experiences content. This step can be accomplished responsive to a user transferring media content files between devices. That is, when the files (including the associated metadata) are pushed across a network to another of the user's devices, the reconciliation process can search through the metadata and reconcile it on the other devices.

Alternately or additionally, this step can be accomplished responsive to a user experiencing content on different devices. For example, assume that the user has the new U2 CD and listens to it at home. The user then takes the CD to work and listens to it at their work computer. In this example, the user's work system will make note that the user has listened to the CD and can, for example, update the user's metadata associated with the last played time parameter. Assume also that during a lunch break, the user rates several of the tracks on the CD using the star-rating system described above. The user's work system can then, via the reconciliation process mentioned above, see to it that the user's metadata is reconciled on his home computer. In this example, only the user's metadata (and not the media content itself) is pushed across the network.

By developing metadata and associating, in some way, the metadata with the content that a user experiences, the user can be provided a rich and robust media experience. Further, by reconciling the user's metadata across different user devices, the user can be assured of a content experience that is generally standardized across the various devices that might be used to experience content.

Multiple Users Sharing One or More Devices

One of the advantages of being able to produce and track metadata on a per user basis, as well as reconcile user metadata across multiple devices, is that the system can support multiple users. That is, multiple users who share one or more devices can have their metadata monitored and modified across multiple devices so that their content experience is generally standardized across the multiple devices that they might use to experience content. As an example, consider FIG. 6.

There, a system 600 includes multiple different devices one or more of which can be shared by multiple different users. For example, the system includes a home computer 602a that can be used by four different users-Lance, Melissa, Grace and Max. A kid's computer 602b is presumably used by the kids. In addition, there are three additional computers—604a (Lance's work computer), 604b (Melissa's work computer) and 604c (Grace's dorm computer). Additional devices include two PDAs 606a, 606b, three cell phones 608a, 608b, and 608c, as well as a CD/DVD player 610.

Assume in this example, that the users share a content collection that includes music—both in the form of CDs and digital music files. As is usually the case, assume also that the users have different listening habits, likes and dislikes. So, for example, while Lance may prefer to listen to Jimmy Buffet, The Doobie Brothers, and Dave Matthews Band, Grace may prefer Britney Spears, and various Disney soundtracks such as The Little Mermaid, The Lion King and Tarzan. Accordingly, in this embodiment, each of the user's individual media-playing experience is monitored and metadata is produced for and associated with each of the users and the associated content. Thus, each user can have a per-user experience based on their actually observed content-experiencing habits.

In addition, each of the individual devices with which particular users interact can have user metadata provided to it for reconciliation as described above. Thus, in this example, Lance's metadata can be provided for reconciliation between the home computer 606a, Lance's work computer 604a, his PDA 606a, his cell phone 608a and the family CD/DVD player 610. Similarly, Grace's metadata can be provided for reconciliation between the home computer 602a, Grace's dorm computer 604c, her cell phone 608b and the family CD/DVD player 610, and so on.

Figure 7:
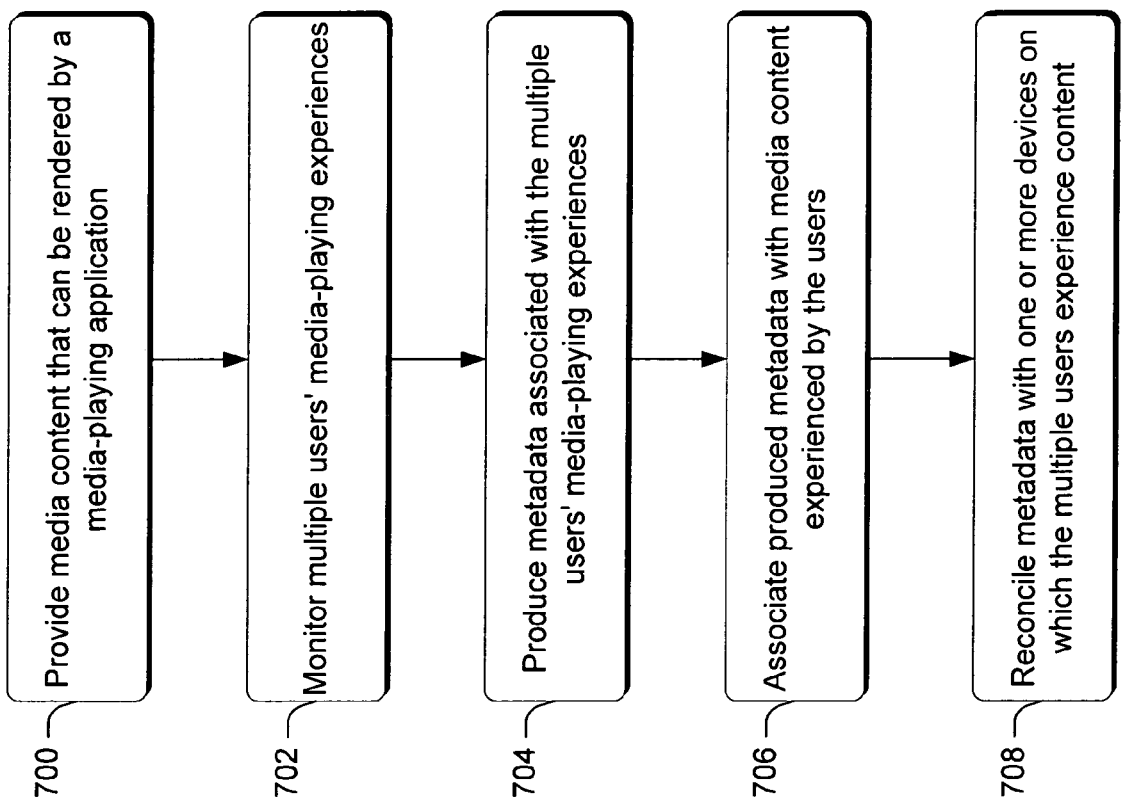
FIG. 7 is a flow diagram illustrating steps in a method in accordance with one embodiment.

FIG. 7 is a flow diagram of steps in a method in accordance with one embodiment. The method can be implemented in any suitable hardware, software, firmware, or combination thereof. In but one embodiment, the method can be implemented in software.

Step 700 provides media content that can be rendered by a media-playing application. Any suitable content can be provided such as digital audio, digital video and/or digital audio/video and the like. In one embodiment, such as one that is discussed above, the media content is provided as music content. Typically, although not exclusively, such content is provided as a file or files that are located on a local computing device such as a user's personal computer or handheld device. Such content can, however, be provided on a remotely-accessible device such as another computer or server linked via a network.

Step 702 monitors multiple users' media-playing experiences. This step can be implemented by noting, among other things, what content is experienced by the users and when it is experienced. In the music content embodiment, this step is implemented by monitoring each user's listening habits. Non-exclusive, specific examples of parameters that can be monitored are given above in the section entitled "Exemplary Schema of User Behaviors".

Step 704 produces metadata associated with the users' media-playing experiences. This step can be implemented by producing metadata that is associated with the various parameters that can be monitored. Again, examples of this are provided above. Step 706 associates produced metadata with media content experienced by the users. This is done on a per-user basis. This step can be implemented in any suitable way. For example, the metadata can comprise part of a piece of content that includes the content itself, an example of which is given above. Additionally or alternately, the metadata can be associated with an identifier that is itself associated with the content.

Step 708 reconciles user metadata with one or more devices on which the various users experience content. This step can be accomplished responsive to a user transferring media content files between devices. That is, when the files (including the associated metadata) are pushed across a network to another of a user's devices, the reconciliation process can search through the metadata and reconcile it on the other devices.

Alternately or additionally, this step can be accomplished responsive to a user experiencing content on different devices. For example, assume that a user has the new U2 CD and listens to it at home. The user then takes the CD to work and listens to it at their work computer. In this example, the user's work system will make note that the user has listened to the CD and can, for example, update the user's metadata associated with the last played time parameter. Assume also that during a lunch break, the user rates several of the tracks on the CD using the star-rating system described above. The user's work system can then, via the reconciliation process mentioned above, see to it that the user's metadata is reconciled on his home computer. In this example, only the user's metadata (and not the media content itself) is pushed across the network.

By developing metadata for multiple users and associating, in some way, the metadata with the content that the users experience, the various users can be provided a rich, robust, and user-specific media experience. Further, by reconciling each user's metadata across different devices that the individual users may use, each user can be assured of a content experience that is generally standardized across the various devices that might be used to experience content.

Exemplary File Structure for Multiple-User Metadata

Figure 8:
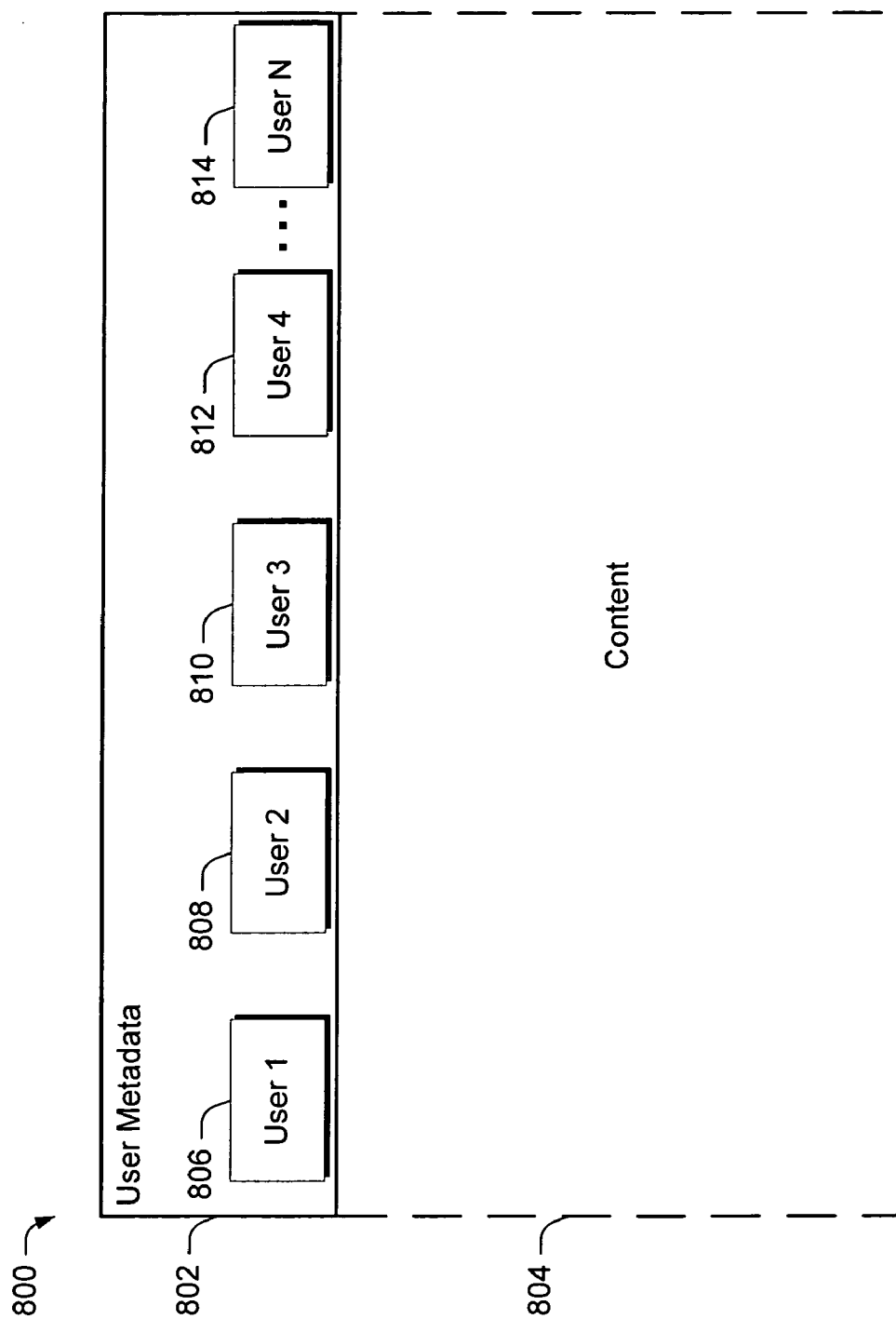
FIG. 8 is a block diagram that illustrates aspects of one embodiment.

FIG. 8 shows a diagrammatic representation of an exemplary file structure in accordance with one embodiment generally at 800. File structure 800 comprises a user metadata portion 802 and, optionally, a content portion 804. Within the user metadata portion 802, user metadata for multiple users can be maintained. As an example, metadata for individual users 806, 808 810, 812, and 814 is shown. Any suitable number of users can be included in the file structure. In addition, any suitable type of metadata can be included. Examples of metadata appear in the section entitled "Exemplary Schema of User Behaviors" above.

Note that the file structure may or may not contain the actual content with which the metadata is associated. In some embodiments, the content that is included in the file structure includes individual songs or tracks. Accordingly, the accompanying metadata is associated with the individual tracks or songs that are included in the file structure.

Pre-Determined Number of Users

In some embodiments, it can be advantageous to limit the number of users whose metadata is included with a file. This is especially the case when the content accompanies the metadata. Specifically, it can be desirable to have the size of the metadata have a limit that is defined in some relation to the size of the content that is also included in the file. Else, there may be cases where the size of the metadata (e.g. if there were many many users) would undesirably exceed the size of the content itself. Thus, in some embodiments, it is desirable to maintain the size of the metadata somewhat smaller than the size of the content itself.

In the instance where the file structure includes individual songs or tracks, it has been found that a suitable number of users, given the metadata described above, is around five. Of course, this number may vary depending on the type of content contained in the file structure and any compression techniques that might be used to compress the user metadata.

Protecting the Users' Privacy

In some scenarios there is the possibility that a user will share their content with others. For example, in the multiple user scenario where multiple users share one or more devices, it is possible that one of the users will want to share their content with others who are not necessarily in the user's group. For example, peer-to-peer networking has enabled individuals to share their content with others around the globe. There are, however, privacy concerns that are associated with this type of sharing. Specifically, if a user shares their files (which include metadata for not only them, but possibly others), if the users are identified with any degree of precision, then it is possible that strangers may acquire their metadata and thus, be able to learn about their listening habits. Further, if a user is identified by their email address, as can sometimes be the case in peer-to-peer and other scenarios, it is possible and quite likely that this user will find themselves inundated with unwanted emails or spam. Needless to say, this is an undesirable situation.

In accordance with one embodiment, the user can be identified in a manner that they (and, where applicable, others in their group) can readily recognize, but which is not recognizable by others who are not in their group and not reversible to ascertain the user's identity.

In one example, this can be done when the user logs on to a device. For example, when a user logs on to a device, they typically log on using their name entered as a character string. So, if John Doe logs onto a device, they typically type in "John Doe" or "John". A process during log on takes a pre-determined number of letters of the user's name, say "Joh" and then adds a string that is produced by taking a mod hash of the remaining letters. In one example, this can produce a three digit number. So, "John Doe" becomes "Joh268".

Figure 6:
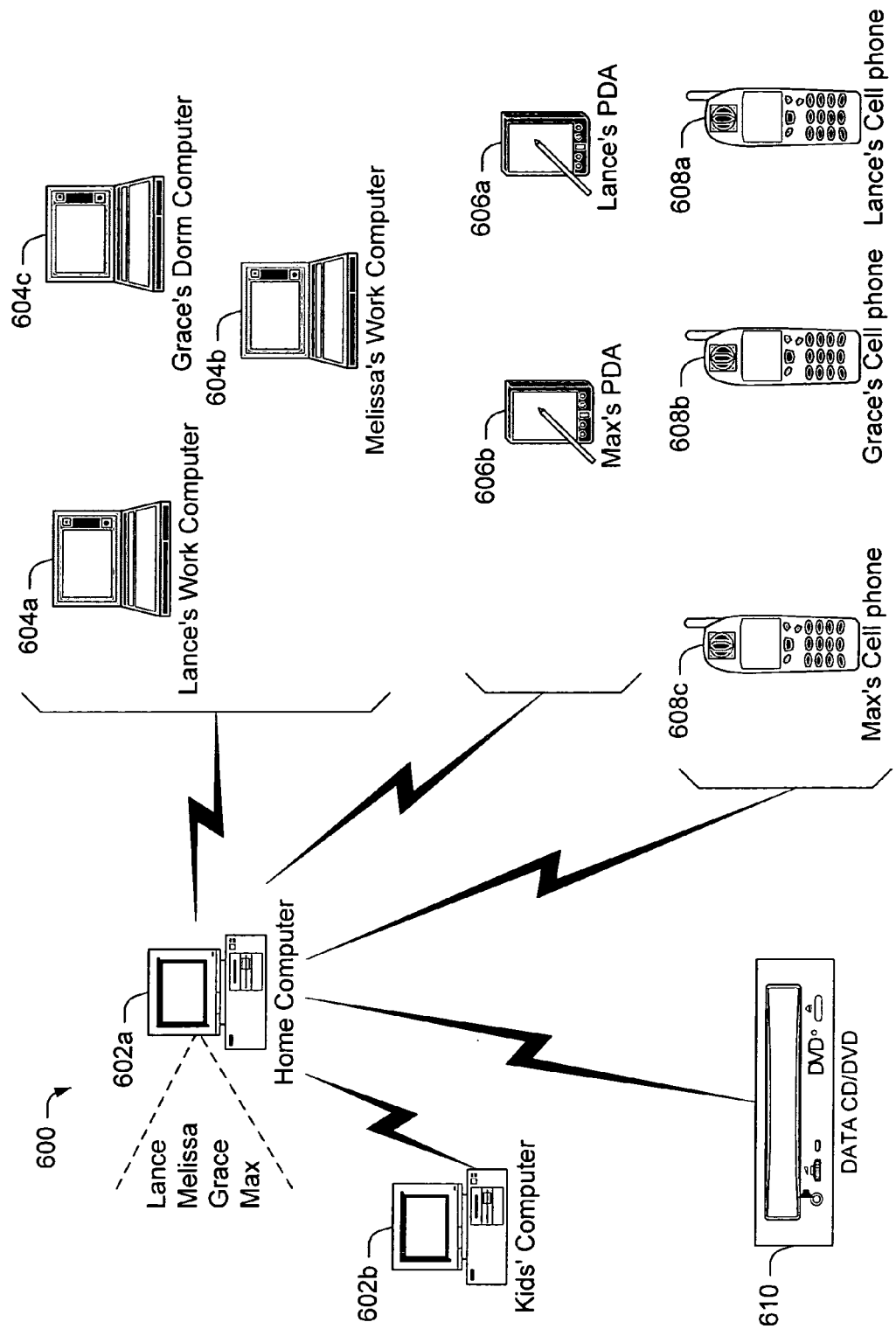
FIG. 6 is a block diagram illustrating an illustrative computing system in accordance with one embodiment.

Thus, in the example of FIG. 6 where the users include Lance, Melissa, Grace and Max, these character strings become: Lan456, Mel902, Gra222, and Max890. Thus, each of the users has enough information to ascertain who the other users are. Yet, individuals who are strangers and outside of this group have no way of ascertaining the true identities of these individuals. Hence, these strings are sufficiently precise to ensure few collisions, but sufficiently imprecise to not disclose personal information about the user. This can be especially critical in the era of peer-to-peer music sharing.

This embodiment also provides an approach that is deterministic—meaning that all experience points that are used by a particular user can compute the hashed name to arrive at the same identifier.

Figure 9:
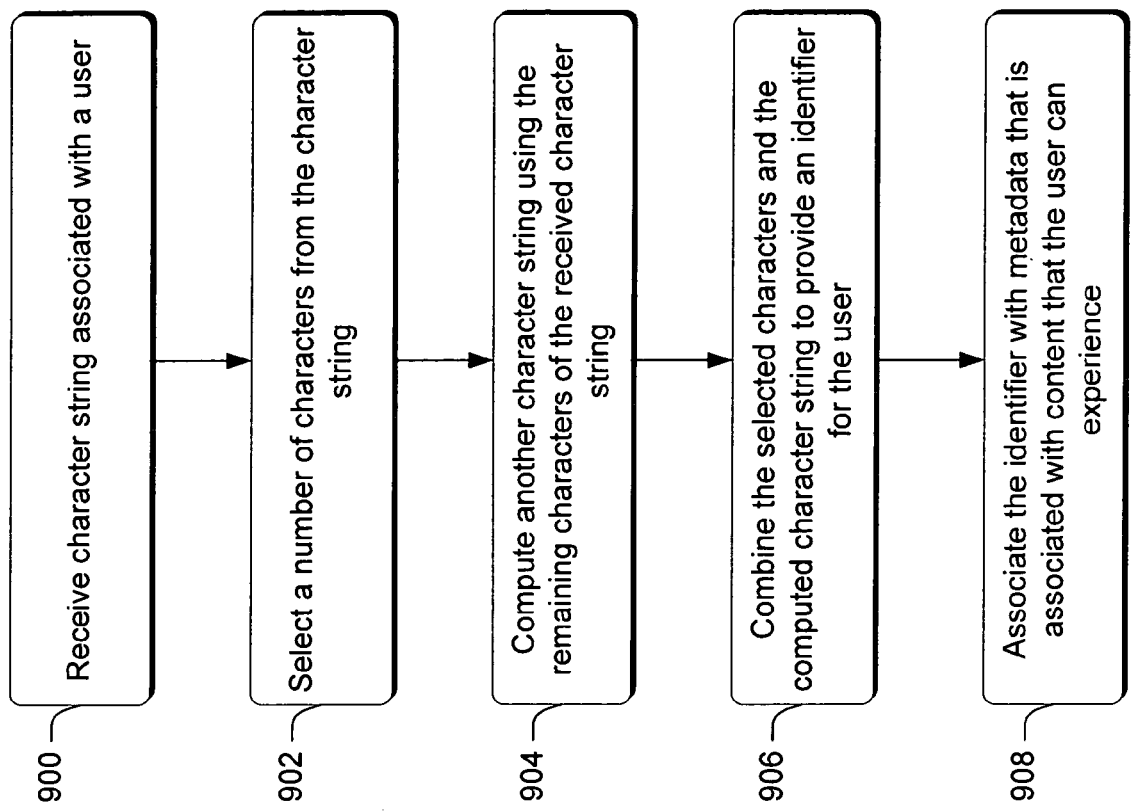
FIG. 9 is a flow diagram illustrating steps in a method in accordance with one embodiment.

FIG. 9 is a flow diagram of steps in a method in accordance with one embodiment. The method can be implemented in any suitable hardware, software, firmware, or combination thereof. In but one embodiment, the method can be implemented in software. In some embodiments, the method is implemented in software that resides on multiple user devices on which a user can experience content. For example, the software can reside on the user's home computer, PDA, and work laptop if those are the devices on which a user is likely to experience content. Advantageously, the software can be provided to be deterministic so that the outcomes given a particular character string are standard across all devices.

Step 900 receives a character string associated with a user. This character string can be received when the user logs onto a particular device on which they intend to experience content. Alternately, this character string can be received when the user first attempts to experience content on the device. Step 902 selects a number of characters from the character string. Any suitable number of characters can be selected. Step 904 computes another character string using the remaining characters of the received character string. This step can be implemented in any suitable way. In the example given above, a hash function was used to compute the character string to arrive at a three digit string. Step 906 then combines the selected characters of the original character string and the computed character string to provide an identifier for the user. Step 908 associates the identifier with metadata that is associated with content that the user can experience.

The above method permits each user to be uniquely identified in a recognizable way and to have their metadata associated securely with them. In addition, the method of identification is secure in that it is mathematically difficult or infeasible to ascertain who an individual is from their identifier. In this way, the identifier can be written into a media file. If the media file roams to another machine, then the other machine can extract the user's playlist, as will become more apparent below.

In addition, all of the user's data (content and metadata) can be roamed to a central server somewhere in much the same way that a user can have a passport identifier and an electronic wallet. For example, the identifier can be passed up to the "My Music" schema which includes a category called "Your listening habits" to identify content that the user likes or has played.

Clearing Out Metadata when Transferring Files

Figure 10:
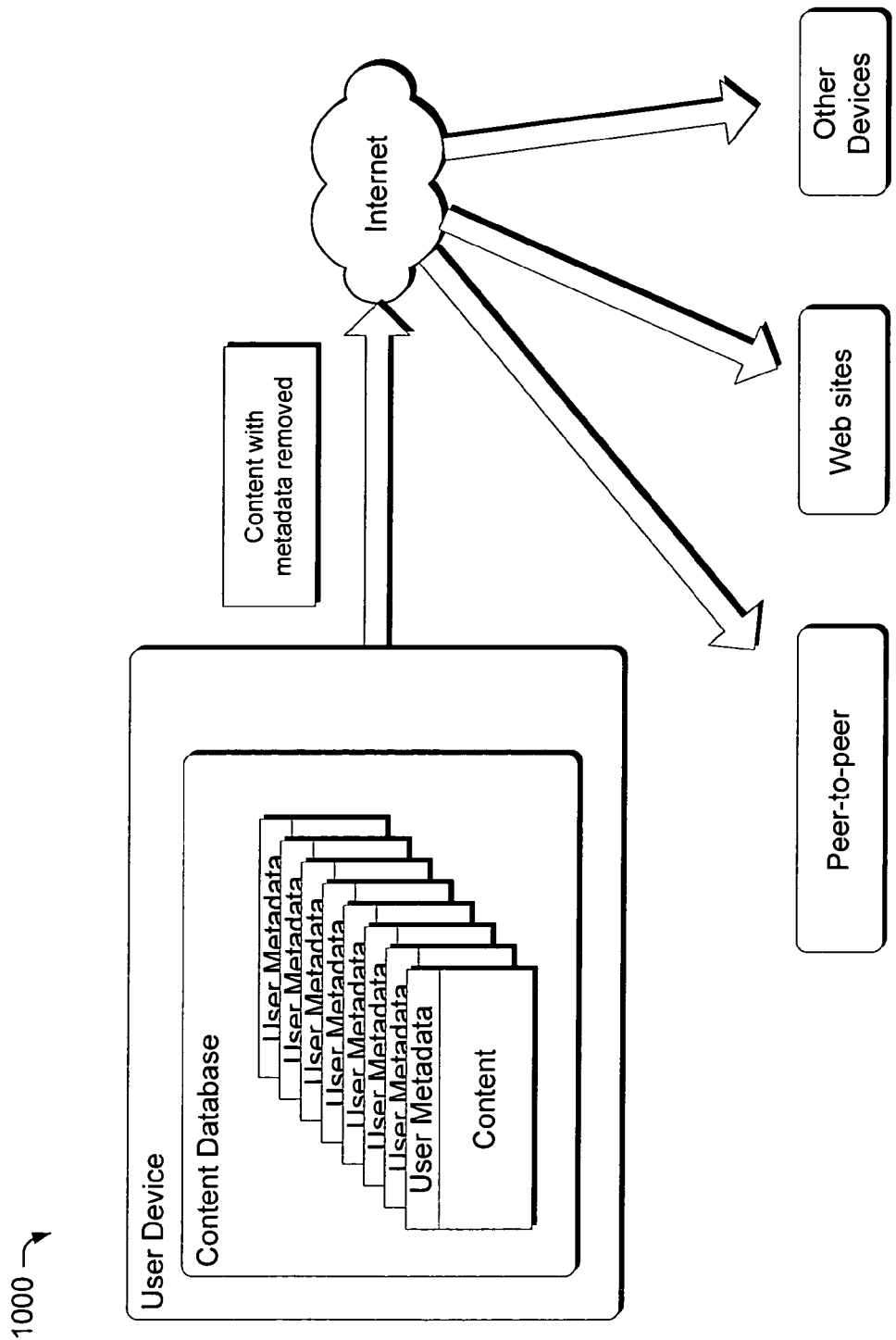
FIG. 10 is a block diagram that illustrates an exemplary system in accordance with one embodiment.

In one embodiment, when a user attempts to push or otherwise provide their content to another device or location, the user can be give the option of clearing out the metadata in any of the files for all of the users. This is especially important when, for example, one user of a user group wishes to push their content to a peer-to-peer location. By having the option of clearing out the metadata for all of the users, each user is assured that their personal metadata will not be available to others. As an example, consider FIG. 10.

There a system is shown generally at 1000. A user device such as a personal computer has a content database that includes the user's content as well as metadata associated with the content. In this example, assume that the content and metadata is in the form of individual media files. When a user attempts to transfer one of their files to another device or location, such as a peer-to-peer location or a web site, they are presented with a user interface that enables them to select a "Clear Metadata" option. If this option is selected, all of the metadata is removed from each of the files that is transferred before the file transferred.

Intelligent Playlists

One of the things that the above-described inventive systems and methods enable is so-called intelligent playlists or "smart playlists". An intelligent or smart playlist is a playlist that is, simply put, more intelligent than static playlists. Smart playlists can embody characteristics that make the playlist adaptive to the user's original intent—that is, to play music of a given and personalized type. Smart playlists can also be more resilient in that the playlist enables the user to continue to enjoy the playlist, as changes are made to the user's environment that render useless static or so-called "legacy" playlists.

In some embodiments, a smart playlist can be thought of as one that embraces a user's intent and, in some instances, can be regenerated periodically to refresh that intent. For example, a smart playlist can be of "Songs I like, that I've not heard of recent" or "Recently Acquired Music". In the latter example, the playlist can describe songs that a user has obtained that are less than one month old. Thus, tomorrow's execution of the playlist will not necessarily play some songs that were played by the user today. Thus, smart playlists can be dynamic in nature.

Smart playlists offer users an exciting new feature that departs from the previous, generally passive music experience. That is, in the past, to create a playlist of songs a user liked, and to maintain the playlist over time would take quite a bit of work. Smart playlists, however, can reduce or, in some instances eliminate, the amount of work required of a user to maintain an enjoyable experience.

Exemplary Playlist User Interface

Figure 11:
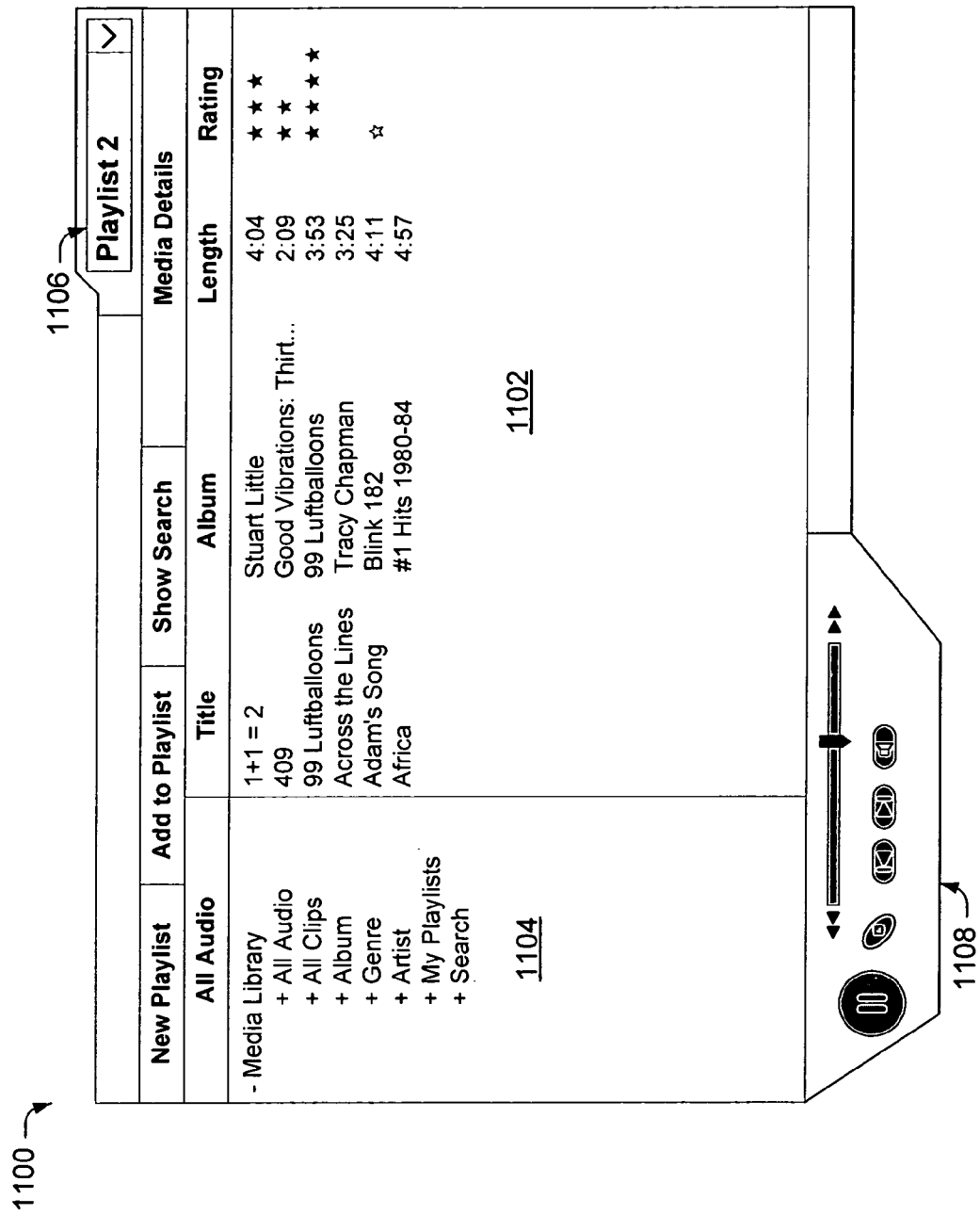
FIG. 11 is a diagrammatic representation of an exemplary user interface in accordance with one embodiment.

FIG. 11 shows an exemplary user interface 1100 that can present a playlist to a user for interaction. The interface includes a portion 1102 that contains song titles, album, track length and rating. Notice that the star-rating system is used where filled-in stars have been rated by the user and clear stars have been given an effective rating by the system. This is advantageous in that it enables the user to see not only their ratings, but the effective ratings that have been automatically provided by the system. Effective ratings are discussed in the section entitled "User_Effective_Rating" above. This category is advantageous in that once the effective ratings are established, they can be used by intelligent playlists (discussed below) to tailor playback to a user's experience habits.

In addition, a portion 1104 is provided for a user to manage their media library. For example, user selections in the portion include, in this example, "All Audio", "All Clips", "Album", "Genre", "Artist", "My Playlists" and "Search". Further, user interface portion 1106, in the form of a drop down menu, enables a user to select from their collection of playlists. A portion 1108 provides a user interface that can be used to enable a user to interact with media that is playing on their media player. Specific controls that are provided include a pause button, stop button, reverse button, fast forward button, play button and volume button.

Exemplary System Overview

FIG. 12 shows an exemplary system 1200 for generating and maintaining a playlist in accordance with one embodiment. System 1200 comprises a playlist engine 1202. The playlist engine can be implemented in any suitable hardware, software, firmware or combination thereof. In the illustrated example, the playlist engine can be implemented in software. In but one embodiment, the playlist engine can be implemented as part of a media player software application that is configured to play media content on a computing device. Such media content can include, as noted above, music content.

System 1200 can also comprise one or more databases. Exemplary databases as shown at 1208 (a local database) and 1212 (a remote database). Any number or types of databases can be provided. In this example, local database 1208 can be maintained on a local computing device or one that is carried by a user. Remote database 1212 can be provided and maintained by a third party. Such third party can be independent of the user. For example, a third party web service can maintain such remote databases. The various databases can be used for maintaining user metadata, media content and/or both. Examples of databases are given above.

Playlist engine 1202 can use one or more filters 1204, 1206, to execute queries on the various databases with which the playlist engine is utilized. These queries can be defined by a playlist file format which is processed by the playlist engine. An exemplary playlist file format is given below in the section entitled "Exemplary File Format". The playlist file format can be used to dynamically maintain the user's playlist. As an example, as a user plays content from one of their playlists, the playlist engine can execute queries defined in the playlist file format to keep the playlist current. For example, assume that the user has a playlist of "songs I have not heard recent" and plays one or more songs from the list. In this case, the playlist engine, on the next query of the pertinent database, would be returned a playlist without the titles of the songs that were recently played by the user.

In addition to using one or more filters to execute queries on local resources, system 1200 can utilize one or more filters for executing queries on remote databases. For example, filters 1210 can be used to enable the playlist engine to query remote database 1212.

The result of the queries by the playlist engine is a playlist such as the one shown at 1214. This playlist can be rendered via a suitable user interface (such as user interface 1100 (FIG. 11)).

FIG. 13 is a flow diagram that describes steps in a method in accordance with one embodiment. The method can be implemented in any suitable hardware, software, firmware or combination thereof. In the illustrated example, the method is implemented in software. As but one example, at least portions of the method can be implemented by a playlist engine such as the one described in connection with FIG. 12.

Step 1300 provides one or more filters that can be used to execute queries. Examples of filters are given below. Step 1302 queries one or more databases using at least one filter. The databases can comprise, for example, local databases or remote databases. Step 1304 receives a result set from the query. Step 1306 then provides the result set as a playlist for a user. It should be noted that step 1302 can be executed responsive to a user actually initiating a search by requesting that a search be done. Additionally or alternately, step 1302 can be implemented in the background, responsive to, but unbeknownst to a user interacting with a particular media player with which the described method is associated.

Exemplary File Format

In one embodiment, intelligent or smart playlists are defined by a file format that is processed by the playlist engine to provide one or more playlists. In the particular example provided and explained below, the file is define in XML (Extensible Markup Language) through the use of SMIL (Synchronized Multimedia Integration Language) syntax. It is to be appreciated and understood that the file format can be defined using any suitable language, syntax, and the like, without departing from the spirit and scope of the claimed subject matter.

XML is a hierarchical, tag-based language that will be known and understood by those of skill in the art. SMIL enables simple authoring of interactive audiovisual presentations. SMIL is typically used for "rich media"/multimedia presentations which integrate streaming audio and video with images, text or any other media type. SMIL is an HTML-like language that will readily known and understood by those of skill in the art.

FIG. 14 shows an exemplary file format that is defined in XML using SMIL syntax. In this example, the file format is divided into three distinct portions: a header portion, a static block portion, and a dynamic block portion, each of which is discussed below.

The outer elements in this file format take on a SMIL syntax (e.g. the "<smil>" tags). The header, i.e. "HEAD" elements, encapsulates global playlist metadata. The Body elements encapsulates the actual playlist content. The first "SEQuence" tag (in the static block portion) encapsulates an enumerated list of static elements with intelligent name-independent auto-repair metadata as will be described in more detail in the section entitled "Auto-Repair" below. The second "SEQuence" tag (in the dynamic block portion) encapsulates an enumerated list of dynamic conditions with parameters necessary to behave as authored. Having static and dynamic portions can be useful for supporting different types of devices. For example, some devices that a user might use may not have the capability to execute a database query. As the dynamic block portion is utilized for database queries, these types of device would not use the dynamic block portion. However, by providing a static block portion that contains data that is produced by a query, these devices can still have access to the data that results from a database query. This is discussed below in more detail in the section entitled "Caching".

Header Portion

The header portion of the file format encapsulates global playlist metadata. In this example, this includes the title of the playlist, the author of the playlist, category, genre, one or more user names and one or more associated user ratings.

The user names are the names of those users whose metadata are associated with the playlist. The user ratings are ratings on the playlist itself.

This file format is interesting and useful for a number of reasons, among which include the notion that playlists can be defined on a per persona basis. That is, playlists can be defined in terms of and specific to the individual users who use the playlist. So, for example, if one user chooses to rate this particular playlist a 5-star playlist, this will affect behavior within an application (e.g. the media player application that uses the file format to generate a playlist) on a per user basis.

Static Block Portion

The next portion of the file format is the static block portion. This portion simply contains a list of files that is produced as a result of one or more database queries. The static block portion contains an identifier of the user who rendered the list, the date on which the list was rendered, and, if appropriate, when the list expires. This is explained below in more detail.

The media source tag ("<media>" tag) contains the path of the file (e.g. dirRelativePath . . . . ). If the playlist has 100 songs, then there will be 100 media source tags. In the case of a static playlist (e.g. for a device that cannot execute a database query), the header still applies and the file format can terminate after the static block.

In addition, the static block portion contains a content ID ("cid") and a tracking ID ("tid"). These IDs are used to intelligently locate the media objects or files to which the individual media tags refer, in the event that the media objects or files are not located where they should be. Perhaps they were deleted, renamed, moved and the like. This is discussed in more detail in the section entitled "Auto-Repair" below.

Dynamic Block Portion

The dynamic block portion contains one or more queries. Reading through the XML—there is a "querySet" tag that defines the query. A sourceFilter tag defines a source filter whose name, in this case, is the "Windows Media Local Music Library Filter". This source filter ID is the actual code that gets instantiated and executed. The instantiated code then operates on the data that is included in the fragment tags.

Specifically, here the instantiated code will go to the local music library and retrieve songs where the genre equals "rock", and the artist is not equal to "Elvis". A second filter named "Windows Media Playlist Limit Filter" acts to limit the result set developed by the source filter. In this instance, the limit filter code limits the result set, by size, to 256 Megabytes. Thus, there are source filters that produce result sets in accordance with some criteria, and filters that operate to subtract away individual result elements.

This code then develops a list (i.e. the result of the query). This list can then be provided back into the static block portion for lesser-enabled devices, as noted above. Now, when a lesser-enabled media player or device processes the file format, it will parse through the header and play the titles (that it has) that are listed in the static block portion.

The file format described above can permit playlists to be defined that automatically stay up to date, without requiring the user to do anything to update the playlist. In the illustrated and described embodiment, the intelligent or smart playlist file format can contain one or more queries. The queries are typically based on a "truth" that transcends time, thus enabling this playlist to be accurate for far longer than would a static playlist. As an example, consider a playlist entitled "Songs I like that I've not heard of recent". This playlist can be created by a query for songs where the "User Rating>4stars" and "LastTimePlayed>1 month". This is on a per user basis. Thus, it is fairly easy to appreciate that as a user changes the rating of their songs, or plays content, that the playlist will generate different songs upon evaluation.

In addition, intelligent or smart playlists can be computed in a personalized manner. That is, smart playlists take into account the actual user playing the playlist when the results are enumerated. As an example, consider the playlist entitled "Songs I like that I've not heard of recent". As noted above, this would be a query on Songs where "User Rating>4stars" and "LastTimePlayed>1 month" (on a per user basis). In this case, the playlist engine executing the smart playlist can use the user's context (as exemplified by the user's identification) to know which rating database, and which LastPlayedTime database to use. This results in the same smart playlist file on disk having different meaning to different people. Advantageously, it also enables users to trade their smart playlists in a way that is meaningful to the recipient. This is so on a machine-to-machine basis, for example, across the Internet.

Moreover, smart playlists can be personalized so as to enable an improved roaming experience. Specifically, within the smart playlist file format, user metadata is maintained that enables a user to bring a smart playlist to several of their machines or devices, and have it characterized the same way in each of those environments.

Caching

Recall that in the file format shown and described in connection with FIG. 14, there are two portions that are set off with "seq" tags—a static block portion and a dynamic block portion. There can be many "seq" tags within a file. The static block portion encapsulates an enumerated list of static elements with intelligent name-independent auto-repair metadata. The dynamic block portion encapsulates an enumerated list of dynamic conditions with parameters necessary to behave as authored. In this example, the dynamic block portion is a "seq" block that has a sub-element called "smart playlist".

A smart playlist that is generated using only the static block portion can be thought of as a "smart static playlist" because it contains an enumeration of the songs to play that were previously generated, at some time in the past, by a query defined in the dynamic block portion.

In accordance with one embodiment, a file format is provided that includes both a static block portion that can be utilized by lesser-enabled devices, and a dynamic block portion that can be utilized by devices that are capable of executing database queries.

As an example, consider the following. Assume that a user has a smart playlist entitled "Songs I like that I've not heard of recent". The query block in the file format would have the "User Rating>4stars" and "LastTimePlayed>1 month" clauses on a per user basis. The first time the file format is processed and the query is executed, a set of results is generated in the media player application. Knowing, however, that this playlist may end up on lesser capable devices such as devices without a database, parser, and the like, the result set of the query can be rendered into the same file, but in a different section of the file (i.e. the static block portion). This way the smart playlist file stores both a static rendition of the playlist, and the query clauses.

As one example where the static block portion can be useful, consider the following. Assume that a user wishes to burn a CD that contains both songs and one or more of the user's playlists that he wants his consumer electronic device to be able to play. In this example, the consumer device would just process the static portion of the playlist because it is not configured to execute the dynamic part of the playlist.

To ensure that the static version does not deviate too far from the intent of the playlist, attributes can be added to the static block portion of the file. For example and as noted above, the file can contain attributes such as a "renderedOn" attribute the defines when the static block portion was rendered, and an "ExpiresOn" attribute that defines when the static block portion expires. These items can enable the more intelligent/capable devices to refresh the playlists in the background such that they always remain fresh for the lesser capable devices.

Further, static block portions can be rendered with individual user name attributes. This is useful when a user desires to transfer their specific playlist to a CD-ROM or a portable device. The static set can thus be rendered using their user name. This can be useful in a scenario where this playlist makes its way back into a library and another user opens it. In this case, the media player application can be intelligent enough to not use the static block portion for the first user, but rather can regenerate a new playlist using the correct user data for the new user.

FIG. 15 is a flow diagram that describes steps in a method in accordance with one embodiment. The method can be implemented in any suitable hardware, software, firmware or combination thereof. In the illustrated example, the method is implemented in software. As but one example, at least portions of the method can be implemented by a playlist engine such as the one described in connection with FIG. 12.

Step 1500 defines a file having a portion that can contain static playlist data and a portion that can contain one or more queries. An exemplary file format is described above. It is to be appreciated that any suitable file format can suffice. The term "static playlist data" is intended to include, without limitation, a list of media content, such as files and the like, that can be utilized as a playlist. The term "static" is intended to mean that the list can be utilized by a device that is not configured or able to execute database queries. In this sense, the playlist is static in that it is simply a flat list.

Step 1502 executes one or more queries contained in the file to provide a result set. This step can be implemented by a suitably configured computing device, such as one that has access to a database that contains the data that is utilized to provide a playlist. Step 1504 provides the result set as a static rendition of the playlist in the file. But one example of how this can be done is given above. Step 1506 transfers the file to one or more computing devices that can utilize the playlist to display for a user. If the devices are suitably enabled devices, then such devices can typically use the one or more queries to maintain current playlists on the devices. If, on the other hand, the computing devices are not suitably configured devices that can execute database queries, then such devices can simply use the static playlist data to provide playlists for the user.

Extensibility Mechanisms

In one embodiment, the playlists that are generated by the playlist engine are extensible. This is advantageous because it can enable virtually anyone to write software code that can be used as a filter to provide a playlist. This can be especially useful for third parties, such as third party vendors or external web services, who desire to provide meaningful extensions to the rich playlist data that a user can utilize.

Within the SmartPlaylist element block (see FIG. 14), one or more "querySet" elements are defined. Within a "querySet", there is typically one or more "SourceFilter" elements, and zero or more "Filter" elements". In one embodiment, there can be only one "SourceFilter" within a "querySet". Both "SourceFilter" and "Filter" elements are backed by class objects (i.e. software) that are invoked to interpret the "fragments" within their element block, as discussed above. This permits a smart playlist to call upon external code to interpret what should be permitted to be a part of the resultant set of media in the playlist.

In this example, a "SourceFilter" is different from a "Filter" in that it creates content as a result of its processing, whereas a "Filter" does not create content. Rather, a "Filter" removes or otherwise limits the content that is provided by a "SourceFilter". For example, this SourceFilter:

```
<sourceFilter type="smartFilterObject" id="GUID"
    name="Windows Media Local Music Library
Filter">
    <fragment name="Genre">
        <argument name="Condition">EqualTo</argument>
        <argument name="Value">Rock</argument>
    </fragment>
``` is going to yield content where "Genre equals Rock" from the "Windows Media Local Music Library". This means that the output of this object is a list of "Rock" media that exists in a library.

A "Filter", on the other hand, brings no media to the equation, but has rejection rights on any media brought to the equation from the "SourceFilter" objects. That is to say that the "Filter" objects literally just remove or filter out content. For example, this Filter:

```
<filter type="smartFilterObject" id="GUID"
name="Windows Media Playlist Limit Filter">
    <fragment name="LimitBySize">
        <argument name="NumberOfMegabytes">256</argument>
    </fragment>
``` is going to limit the size of the result set of music to be 256 MBs. Thus, this filter does not add media, it just lets data pass through until its criteria is met.

In this particular embodiment, fundamental to this capability is having application program interfaces (APIs) that are able to pass around a "media object" that reflects the individual media being sourced, and all its relevant attributes such as Title, Artist, Genre, Filename, File size, duration, and so on. The above LimitBySize filter would use the FileSize metadata to enable its decision.

In this embodiment, by virtue of the design of the XML, any suitable identifier (e.g. "GUID", classId and name, GUID and URL string) can be used for a filter. Thus, when executing this code, the playlist engine would simply just launch whatever source filter is registered in the list. This can enable third parties to provide their own filters for extensibility, as will be appreciated by those of skill in the art.

As an example, consider the following. Not all filters need to use a local database as a source for sourceFilter or Filter logic. The code that can be invoked by the playlist engine can really be provided anywhere. Here are two examples:

An example of a "Filter", could be the "Amazon.com Top 100 Best Sellers List". Thus, whenever a playlist file is evaluated, the software code can be invoked and the code implementing the "Amazon Best Sellers List" can take a media object that it is given (e.g. a media object that contains one song of a list of songs that a user has in their personal library), send the media object to an appropriate web site to see if the song on the list of songs appears on Amazon's best sellers list. If the song is on the list, then the song is allowed into the playlist. If the song is not on Amazon's list, then the song is not allowed on the playlist. An exemplary filter specification is given below.

```
<filter type="smartFilterObject" id="GUID" name="Amazon Top 100 Best Seller List">
    <fragment name="ListName">
        <argument name="ListURL">www.amazon.com\AT100BSL.asp%AMGID%</argument>
    </fragment>
```

The above example is explained in the context of a logical, lesser efficient implementation. One embodiment of this implementation is to first download the list of the 100 Best Sellers and then do all the comparisons locally for efficiency.

Another example of a "SourceFilter" can be a "peer-to-peer" samples service such as "FYE Music". Being a Source Filter, the name and the fragments passed in will define the scope of the result set returned. In this example, the FYE service can return back a list of music hosted on a server where Genre=Rock. Because the source filter passed back "media objects", each media object can have an URL to the actual content, thus making the resultant playlist work on the user's media player. For example, assume that a user wants to listen to those songs that are on "the Amazon Top 100 Best Sellers List" that are also on the "Billboard 100". In this example, the user does not own the specific media. The contents of the smart playlist that results from the user's query is a result set that contains a list of these songs. In addition to providing a list of these songs, other third parties, such as the content owners, can also source the content. That is, the playlist that is generated and displayed for the user can have associated URLs to the actual content so that the user's device can go onto the Internet and the user can purchase and/or retrieve the song.

Thus, in accordance with the above-described embodiment, there can be multiple classes of code, each voting on whether a media item should be in a playlist. In addition, code can be provided that uses logic and data that is external to the playlist and the collection of media objects representing the items in the playlist. An example of this is third party code that can provide filters that are accessible via a network such as the Internet. For example, assume that a user defines a playlist for "All the songs that I have whose artists' birthdays are this week". The birthday information is not information that the user currently has. Rather, a third party has this information. Thus, when the playlist file is processed by the playlist engine, the playlist engine produces a list of the songs that the user has. The playlist engine can then send this media object for each item in the source filter's return set to a third party, as specified in the playlist file, which third party can then take the media objects created by the user and filter it in accordance with their own data. The third party can then return or filter out the media object prior to execution.

Additionally, through the use of the structure provided in the illustrated and described XML file, smart playlists can be authored to produce a variety of operations that are facilitated with any suitable Boolean operators, e.g. AND and OR logic, as will be appreciated and understood by those of skill in the art. Thus, the robust possibilities for playlist rendering are seemingly endless. As but one example, consider the playlists described in the section entitled "Exemplary Playlists" immediately below.

Exemplary Playlists

The following constitutes but one exemplary listing of playlists that can be provided utilizing the inventive techniques described above. The playlists can make use of one or more of the parameters described above in the section entitled "Exemplary Schema of User Behaviors."

"My favs -- All 4 and 5 star rated songs"
Filter: Type = audio, UserRating > 70,
Sort: UserRating
"My favs -- 64 Mb worth of 4 + 5 star rated songs"
Filter: Type = audio, UserRating > 70, LimitFilter = 64 MB
Sort: UserRating
"My favs -- 128 Mb worth of 4 + 5 star rated songs"
Filter: Type = audio, UserRating > 70, LimitFilter = 128 MB
Sort: UserRating
"My favs -- One CD-R worth of 4 + 5 star rated songs"
Filter: Type = audio, UserRating > 70, LimitFilter = 630 MB
Sort: UserRating
"My favs, that I've not heard of recent"
Filter: Type = audio, UserRating > 70,
Sort: UserLastPlayedTime
"Workday 100 -- Favorite Weekend songs"
Filter: Type = audio, UserRating > 70, Limit items to 100
Sort: UserPlaycountWeekend
"Weekend 100 -- Favorite Weekdays songs"
Filter: Type = audio, UserRating > 70, Limit items to 100
Sort: UserPlaycountWeekday
"Caffinated 100 -- Favorite Late Evening songs"
Filter: Type = audio, UserRating > 70, Limit items to 100
Sort: UserPlaycountNight
"Recently Aquired Music"
Filter: Type = audio, UserLastPlayedTime = <filter condition..
E.g.: In the last Month>
Sort: AquisitionTime
"Recently Aquired Music (Yet to be rated)"

-continued

Filter: Type = audio, AquisitionDate = <in the last Month>,
UserRating = <NULL>,
Sort: AquisitionTime
"Songs I've not heard of recent"
Filter: Type = audio
Sort: User Rating, then UserLastPlayedTime (strongest sort)
"Songs not yet rated"
Filter: Type = audio, UserRating = <NULL>,
Sort: Album, then Artist (strongest sort)
"Sucky music -- Songs I dislike and should delete"
Filter: Type = audio, UserRating = <10
Sort: Album, then Artist (strongest sort)
"Songs with digital rights management"
Filter: Type = audio, Protected = Yes
Sort: Album, then Artist (strongest sort)
"Songs other users like"
Filter: Type = audio, ServiceRating > 70
Sort: UserRating
"My Kazaa Music -- All of it"
Filter: Type = audio, PathFilter Contains "Kazaa"
Sort: Album, then Artist (strongest sort)
"My Kazaa Music -- Recently Aquired"
Filter: Type = audio, PathFilter Contains "Kazaa", AquisitionDate = <in the last Month>
Sort: AquisitionTime
"Hi-Res video clips"
Filter: VIDEO_VIDEO_WIDTH > 300
Sort: Title Auto-Repair In accordance with one embodiment, playlists are imparted with characteristics that enable them to be repaired automatically.

As an example, consider the following. Once a media item is resolved and added to the static block portion of the playlist file, data associated with the media item, including the path to the media item, is there in static form. The actual object or file that is referred to by the media item, however, can be altered in many ways. For example, the object or file can be deleted, renamed, moved, and the like. Thus, in this embodiment, playlists are provide to be more robust through the use of a couple of different characteristics. First, however, recall the components of the file structure as set forth below.

```
<media src="dirRelativePath.wma" cid="GUID" tid="GUID">
    <FileTrackingBLOB>0x00....x00</FileTrackingBLOB>
</media>
```

There, each media source includes a path, a content ID ("cid") and a tracking ID ("tid"). These IDs are embodied as globally unique identifiers or "GUIDs", (e.g.: "F1B9284F-E9DC-4e68-9D7E-42362A59F0FA"). The "FileTrackingBLOB" tag pertains to a "Binary Large Object"—a string of binary numbers. This is an older, less compact, less robust version of a tracking ID provided for compatibility purposes with older versions of Windows.

Content IDs

The content ID is an identifier that is assigned to every song or piece of media content. The content ID is analogous to an ISBN on a book or the UPC code on a per-food item. That is, in the case of a book, regardless of the printing, the same book will have a common ISBN number.

Typically, this identifier can be assigned by a third party service. In the illustrated example, if a song or piece of content has metadata associated with it, it will be provided with a content ID. The content ID of a song or piece of media content can remain the same regardless of whether the metadata associated with the content changes. For example, when a user inserts a CD into their personal computer, the media player can cause the computer to access and retrieve textual, factual metadata for that CD on behalf of the user. Typically, this can be done by a background process via a network-accessible server that contains the metadata information. The net result of this process is that the user gets textual data (i.e. metadata) that describes the CD that did not previously exist on that CD. When this process is performed, a content ID that is associated with each track or song can also be assigned. This content ID is universally the same, i.e. everyone receives the same content ID for the same songs or tracks. Thus, if a user receives a playlist via email from a friend, it can contain content IDs for the songs on that playlist, which content IDs are the same for the corresponding content that the recipient owns. This enables users to share playlists and play songs even though they are stored in different places in the file system or in different file systems.

One scenario worth pointing out here is that of two teenage users with similar taste in music, sharing their playlist but not their content. Because of the content IDs in the playlist, the playlist will function on both machines for all of the content that is on that machine. This works because when the playlist is processed by the playlist engine and played, the content ID is used to query the user's music database for content having the "content ID". If the corresponding content is found, the playlist is auto-repaired, i.e. automatically repaired, with the appropriate local path of the recipient's media.

Tracking IDs

In the event that the content does not have a content ID (perhaps the content was created with a tool that did not write a content ID for the content), the system can rely on a tracking ID or "tid" to repair the content's path. A tracking ID is essentially an identifier that is utilized by the device's file tracking system to track files. The notion of tracking IDs for purposes of file tracking within file systems is understood by those skill in the art. For example, in the NT file system, an "object ID" is used that is more robust than those tracking IDs used in the past. The object ID allows one to maintain a small number (a GUID) that is associated with every file that is stored on an NT File System. This object ID is tightly bound to the file such that if the file is copied from one physical hard drive to another physical hard drive, the object ID is carried with the file. This permits efficient file tracking, as those of skill in the art will appreciate and understand.

Thus, if a particular piece of content does not have a content ID or, alternately, if the content ID does not result in the content of interest being located, the system can utilize the tracking ID in an attempt to locate the content of interest. In this example, the device's file system can be used to attempt to locate the content of interest using the tracking ID. If the content of interest is found, then the playlist can be repaired with the content's path. In this particular example and in the event that the tracking ID cannot locate the content of interest, then the system can attempt to use any other methods to locate the content. For example, the "FileTrackingBLOB" referred to above is one such legacy version of the Window OS link tracking ID that is somewhat bigger and less resilient than the tracking ID—yet can still permit content of interest to be found.

Locating the content can take place relative to the user's local device. Alternately, the various techniques described above and below can be used to locate content across network-connected devices (e.g. LAN-connected or WAN-connected devices).

Figure 16:
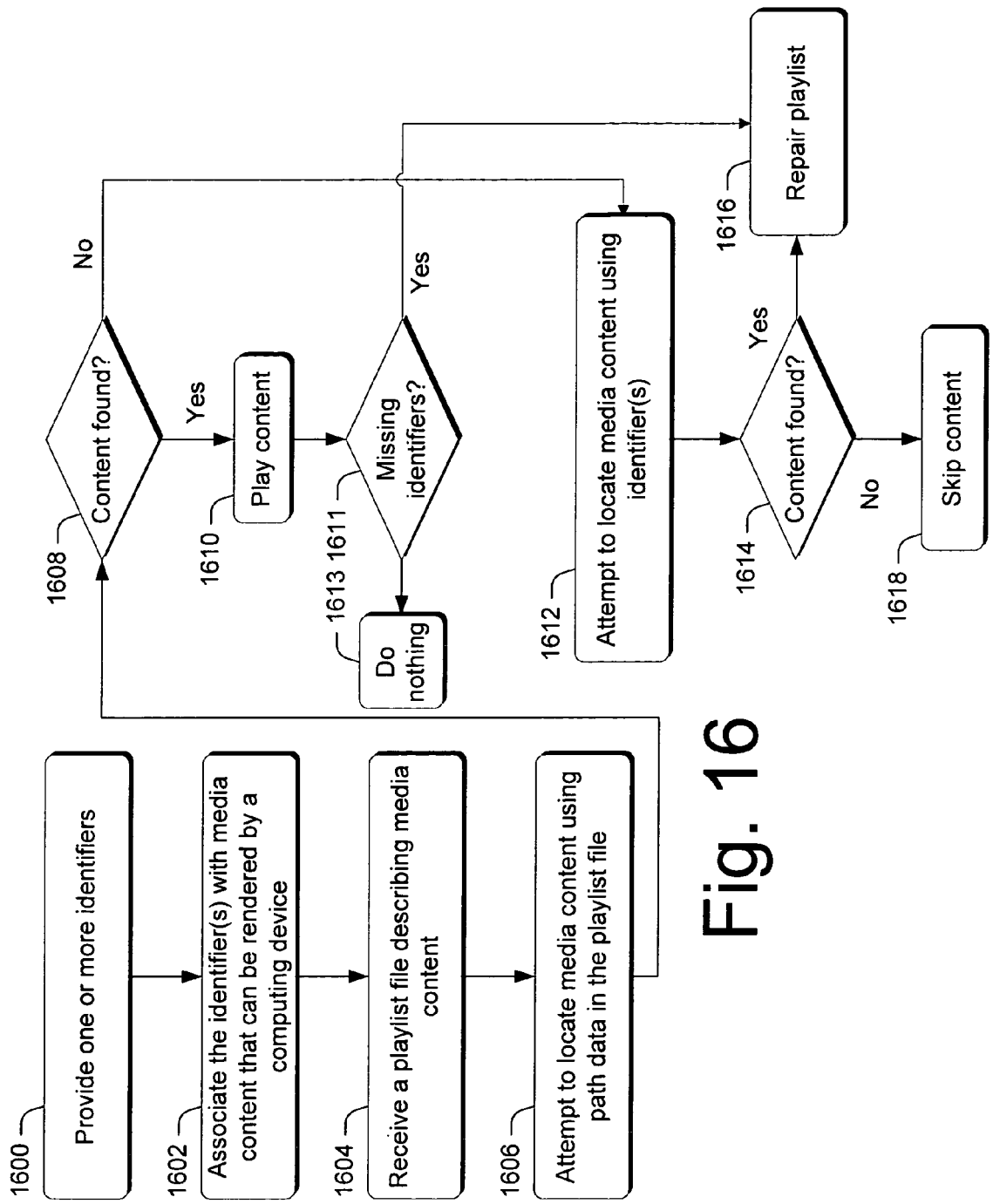
FIG. 16 is a flow diagram illustrating steps in a method in accordance with one embodiment.

FIG. 16 is a flow diagram that describes steps in a method in accordance with one embodiment. The method can be implemented in any suitable hardware, software, firmware or combination thereof. In the illustrated example, the method is implemented in software. As but one example, at least portions of the method can be implemented by a playlist engine such as the one described in connection with FIG. 12.

Step 1600 provides one or more identifiers. Any suitable types of identifiers can be provided. Examples of identifiers are given above. Step 1602 associates the identifier(s) with media content that can be rendered by a computing device. Any suitable media content can be used for the purpose of associated the identifier(s). In but one example that is utilized throughout this text, the media content comprises music content. In addition, this step can implemented in any suitable way. For example, one or more identifiers can be associated in a media content file that includes the media itself. This can take place, for example, when the media content is created. Alternately, identifiers can be associated with the media content after the media content is created and, for example, received by the user. Step 1604 receives a playlist file that describes various media content. This step can be implemented by a suitably configured playlist engine, such as the one described above.

Step 1606 attempts to locate the media content using path data that is included with the playlist file. In but one example, this step can be implemented by providing, in the playlist file, a path description to the media content such as a URL. In this example, the media player or some other software component attempts to follow the path description to the appropriate media content. Step 1608 determines whether the content is found. If the content is found, then step 1610 can play the content for the user. If, on the other hand, the content is not found, then step 1612 attempts to locate the media content using one or more of the identifiers. If, by using the identifier(s) the content is found (at step 1614), then step 1616 repairs the playlist by inserting the correct path description into the playlist and the content can be played. If, on the other hand, the content is not found, then step 1618 can skip the content.

After step 1610 plays the content, step 1611 determines whether any associated identifiers for the content is (are) missing. If the content is missing identifiers, then the method can branch to step 1616 and attempt to repair the playlist. This can be done by attempting to obtain identifiers for the content and then associating the identifiers with the content. One way of obtaining identifiers for the content is to attempt to obtain the identifiers via a third party service that assigns identifiers. For example, such can be accomplished by accessing a web service via the Internet to obtain one or more identifiers. If no identifiers are missing, then step 1613 does nothing.

CONCLUSION

Various systems and methods described above permit a user's content experience (e.g. music playing experience) to be monitored and for metadata describing this experience to be collected. This metadata can be dynamically updated as a user experiences media content and then used to impart to the user a personalized experience that is tailored to that specific user. A user's metadata can, in some instances, provided across a wide variety of computing devices on which the user may experience the media content, thus standardizing the user's personalized media experience. In addition, intelligent or "smart" playlists can be provided which, in some instances, can be dynamically and automatically updated to reflect current user experiences, thus providing a highly personalized and enjoyable content experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
    means for monitoring multiple users' media-playing experiences using a first device on which one or more users can experience the media;
    means for identifying each of the users with an identifier, each user's identifier being recognizable by its associated user, but not being mathematically reversible to ascertain the associated user's actual identity;
    means for producing metadata associated with the users' media-playing experiences;
    means for associating produced metadata with media content experienced by the users;
    means for maintaining, for individual users, at least the metadata in a database on the first device;
    means for updating metadata on at least a second device that can be used by one or more user to experience the media, said means for updating providing metadata from the first device to at least the second device; and
    means for using the metadata to automatically personalize one or more playlists on the first and second devices for at least one of the users to reflect a user's media-playing experience.

2. The system of claim 1, wherein the means for monitoring comprises means for monitoring the users' music-playing experiences.

3. The system of claim 1, wherein:
    the means for monitoring comprises means for monitoring the users' music-playing experiences; and
    the means for producing comprises means for producing metadata for each song that a user plays.

4. The system of claim 1, wherein the means for monitoring comprises a media-playing application configured to play media that one or more users can experience.

5. The system of claim 1, wherein the means for monitoring is embodied on a computing device on which one or more users can experience the media.

6. The system of claim 1, wherein the means for monitoring monitors media that is locally stored on a computing device and locally played on the computing device.

7. The system of claim 1, wherein the means for updating is configured to use, at least in part, a third party.

8. The system of claim 1, wherein the means for updating comprises means for providing both the metadata and its associated media content to at least the second device.

* * * * *